United States Patent
Frank

(10) Patent No.: US 11,246,103 B2
(45) Date of Patent: Feb. 8, 2022

(54) METHOD AND APPARATUS FOR VERIFICATION OF DUAL CARRIER DYNAMIC POWER SHARING

(71) Applicant: Lenovo (Singapore) Pte. Ltd., New Tech Park (SG)

(72) Inventor: Colin Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 88 days.

(21) Appl. No.: 16/865,321

(22) Filed: May 2, 2020

(65) Prior Publication Data

US 2020/0351797 A1 Nov. 5, 2020

Related U.S. Application Data

(60) Provisional application No. 62/843,229, filed on May 3, 2019.

(51) Int. Cl.
*H04W 24/06* (2009.01)
*H04W 24/08* (2009.01)
(Continued)

(52) U.S. Cl.
CPC ........... *H04W 52/34* (2013.01); *H04W 24/06* (2013.01); *H04W 24/08* (2013.01); *H04W 24/10* (2013.01);
(Continued)

(58) Field of Classification Search
CPC ............ H04L 5/0001–0098; H04W 24/02–10; H04W 52/02–60; H04W 72/02–10;
(Continued)

(56) References Cited

U.S. PATENT DOCUMENTS

| 2012/0002630 A1* | 1/2012 | Bergman ............... H04B 7/04 |
| 2017/0195978 A1 | 7/2017 | Lindholm et al. |
| 2017/0215155 A1 | 7/2017 | Nogami et al. |

FOREIGN PATENT DOCUMENTS

| EP | 3668193 A1 | 6/2020 |
| WO | 2019030904 A1 | 2/2019 |

OTHER PUBLICATIONS

Ericsson, "Verification of Pcmax for inter-band EN-DC: total transmitted power", R4-1814709, for TSG-RAN Working Group 4 (Radio) meeting #89, Spokane, WA, USA, Nov. 12-16, 2018 (Year: 2018).*

(Continued)

*Primary Examiner* — Timothy J Weidner
(74) *Attorney, Agent, or Firm* — Loppnow & Chapa

(57) ABSTRACT

A method and apparatus for verifying use of dynamic power sharing in a user equipment between a first carrier transmission and a second carrier transmission. A resource block allocation and modulation for a first carrier transmitted from the user equipment is assigned, and a resource block allocation and modulation for a second carrier transmitted from the user equipment is assigned. The user equipment provides a series of power up commands for both the first carrier and the second carrier until the measured output powers for the first carrier and the second carrier no longer increase. Power down commands are then provided for the first carrier while providing power up commands to the second carrier. The output power for the first carrier and the second carrier is then measured and a determination is made as to whether the output power for the second carrier increases as the output power for the first carrier decreases.

20 Claims, 6 Drawing Sheets

(51) Int. Cl.
| | |
|---|---|
| *H04W 24/10* | (2009.01) |
| *H04W 52/16* | (2009.01) |
| *H04W 52/24* | (2009.01) |
| *H04W 52/26* | (2009.01) |
| *H04W 52/34* | (2009.01) |
| *H04W 52/36* | (2009.01) |
| *H04W 52/42* | (2009.01) |
| *H04W 72/04* | (2009.01) |
| *H04W 72/10* | (2009.01) |
| *H04W 84/04* | (2009.01) |
| *H04W 84/20* | (2009.01) |
| *H04W 88/08* | (2009.01) |
| *H04W 88/18* | (2009.01) |
| *H04W 92/02* | (2009.01) |
| *H04W 92/10* | (2009.01) |

(52) U.S. Cl.
CPC ......... *H04W 52/16* (2013.01); *H04W 52/248* (2013.01); *H04W 52/262* (2013.01); *H04W 52/346* (2013.01); *H04W 52/367* (2013.01); *H04W 52/42* (2013.01); *H04W 72/0473* (2013.01); *H04W 72/10* (2013.01); *H04W 84/042* (2013.01); *H04W 84/20* (2013.01); *H04W 88/085* (2013.01); *H04W 88/18* (2013.01); *H04W 92/02* (2013.01); *H04W 92/10* (2013.01)

(58) Field of Classification Search
CPC ........... H04W 84/005–22; H04W 88/005–188; H04W 92/02; H04W 92/04; H04W 92/10
See application file for complete search history.

(56) References Cited

OTHER PUBLICATIONS

3GPP TS 36.101 V15.6.0 (Mar. 2019), 3rd Generation Partnership Project; Technical Specification Group Radio Access Network; Evolved Universal Terrestrial Radio Access (E-UTRA); User Equipment (UE) radio transmission and reception (Release 15), 1815 pages.
3GPP TS 36.331 V15.5.0 (Mar. 2019), 3rd Generation Partnership Project; Technical Specification Group Radio Access Network; Evolved Universal Terrestrial Radio Access (E-UTRA); Radio Resource Control (RRC); Protocol specification (Release 15), 944 pages.
3GPP TS 38.101-1 V15.5.0 (Mar. 2019), 3rd Generation Partnership Project; Technical Specification Group Radio Access Network; NR; User Equipment (UE) radio transmission and reception; Part 1: Range 1 Standalone (Release 15), 232 pages.
3GPP TS 38.101-3 V15.5.0 (Mar. 2019), 3rd Generation Partnership Project; Technical Specification Group Radio Access Network; NR; User Equipment (UE) radio transmission and reception; Part 3: Range 1 and Range 2 Interworking operation with other radios (Release 15), 193 pages.
3GPP TS 38.213 V15.5.0 (Mar. 2019), 3rd Generation Partnership Project; Technical Specification Group Radio Access Network; NR; Physical layer procedures for control (Release 15), 104 pages.
3GPP TS 38.331 V15.5.0 (Mar. 2019), 3rd Generation Partnership Project; Technical Specification Group Radio Access Network; NR; Radio Resource Control (RRC) protocol specification (Release 15), 489 pages.
Motorola Mobility, "On the SCG MPR/A-MPR and Pcmax for EN-DC with Dynamic Power Sharing", R4-1904676, for 3GPP TSG-RAN WG4 #90bis, Xi'an, China, Apr. 8-12, 2019.
PCT International Search Report for PCT/IB2020/054176, Lenovo (Singapore) Pte. Ltd., dated Jul. 3, 2020.
Ericsson, "Verification of Pcmax for inter-band EN-DC: total transmitted power", R4-1814709, for TSG-RAN Working Group 4 (Radio) meeting #89, Spokane, WA, USA, Nov. 12-16, 2018.
Ericsson, "Verification of Pcmax for inter-band EN-DC: power reduction and dropping", R4-1814710, for TSG-RAN Working Group 4 (Radio) meeting #89, Spokane, WA, USA, Nov. 12-16, 2018.
Motorola Mobility et al., "Maintenance for NR-LTE co-existence", R1-1813351, for 3GPP TSG-RAN WG1 #95, Spokane, WA, USA, Nov. 12-16, 2018.
Motorola Mobility, "Additional Requirements Needed for Dynamic Power Sharing", R4-1912915, for 3GPP TSG-RAN WG4 #92bis, Chongquing, China, Oct. 14-18, 2019.

* cited by examiner

300

| CASE | SCENARIO | OBSERVATION | DYNAMIC POWER SHARING REQUIRED? |
|---|---|---|---|
| DC_(n)71AA | $P_{LTE} = P_{NR} = P_{ENDC} = 23$ dBM | SCG CAN BE DROPPED WHENEVER THERE IS AN MCG TRANSMISSION | NO, CAN DROP SCG EVEN WHEN POWER IS AVAILABLE AND NO SCALING IS REQUIRED |
| GENERAL INTRA-BAND NON-CONTIGUOUS | $P_{LTE} = P_{NR} = P_{ENDC} = 23$ dBM | SCG CAN BE DROPPED WHENEVER THERE IS AN MCG TRANSMISSION | NO, CAN DROP SCG EVEN WHEN POWER IS AVAILABLE AND NO SCALING IS REQUIRED |
| GENERAL INTRA-BAND CONTIGUOUS | $P_{LTE} = P_{NR} = P_{ENDC} = 23$ dBM  MCG MODULATION ORDER IS 64-QAM OR LESS | SCG CAN BE DROPPED WHENEVER THERE IS AN MCG TRANSMISSION | NO, CAN DROP SCG EVEN WHEN POWER IS AVAILABLE AND NO SCALING IS REQUIRED |
| GENERAL INTER-BAND | $P_{LTE} = P_{NR} = P_{ENDC} = 23$ dBM  BOTH MCG AND SCG MODULATION ORDER IS 64-QAM OR LESS | SCG CAN BE SCALED BY X_SCALE WHENEVER THERE IS AN MCG TRANSMISSION | NO, CAN SCALE SCG EVEN WHEN POWER IS AVAILABLE AND NO SCALING IS REQUIRED |
| | $P_{LTE} = P_{NR} = P_{ENDC} = 23$ dBM  MCG MPR = 0 dB | SCG CAN BE DROPPED WHENEVER THERE IS AN MCG TRANSMISSION | NO, CAN DROP SCG EVEN WHEN POWER IS AVAILABLE AND NO SCALING IS REQUIRED |

FIG. 3

METHOD AND APPARATUS FOR VERIFICATION OF DUAL CARRIER DYNAMIC POWER SHARING

FIELD OF THE INVENTION

The present disclosure is directed to a method and apparatus for verification of dual carrier dynamic power sharing, including instances in which a user equipment may prioritize communications with a master cell group over a secondary cell group, where when the power requirements of the communications with the master cell group is reduced, it can be verified that the power is made available to support communications with the secondary cell group.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least a couple of bandwidth extending techniques include the use of carrier aggregation, dual carrier, and/or dual connectivity, where multiple frequency bands from one or more networks are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of a build out of a network that incorporates the initial adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

In at least some instances, the network infrastructure supporting each of the standards may be alternatively referred to as a cell group. In some of these instances, one cell group may be prioritized over the other cell group. In such an instance, the prioritized cell group may be referred to as a master cell group and a non-prioritized cell group may be referred to as a secondary cell group.

In instances, where there are multiple connections, where in some instance the separate connections may involve a connection with a different network infrastructure, managing the overall operation of the communication connections in a particular user equipment relative to the potentially multiple networks can present a challenge, as some of the decisions may be made in an environment with less than complete information, which may allow worst case conditions to be assumed, which could justify an overly conservative approach to enabling the use of available power in support of the multiple carrier communications.

The present inventor has recognized that overly conservative approaches may limit the power that is available for use with a secondary cell group, and furthermore, that it would be beneficial to be able to better verify if a particular user equipment more fully supports dual carrier dynamic power sharing, if it is so identified.

SUMMARY

The present application provides a method for verifying use of dynamic power sharing in a user equipment between a first carrier transmission and a second carrier transmission. The method includes assigning a resource block allocation and modulation for a first carrier transmitted from the user equipment, and assigning a resource block allocation and modulation for a second carrier transmitted from the user equipment. The user equipment provides a series of power up commands for both the first carrier and the second carrier until the measured output powers for the first carrier and the second carrier no longer increase. Power down commands are then provided for the first carrier while providing power up commands to the second carrier. The output power for the first carrier and the second carrier is then measured and a determination is made as to whether the output power for the second carrier increases as the output power for the first carrier decreases.

According to another possible embodiment, an apparatus for verifying use of dynamic power sharing in a user equipment between a first carrier transmission and a second carrier transmission is provided. The apparatus includes a communication interface. The apparatus further includes a controller that assigns a resource block allocation and modulation for a first carrier transmitted from the user equipment, and assigns a resource block allocation and modulation for a second carrier transmitted from the user equipment. The controller further provides the user equipment a series of power up commands for both the first carrier and the second carrier until the measured output powers for the first carrier and the second carrier no longer increase, and then provides power down commands for the first carrier while providing power up commands to the second carrier. The output power for the first carrier and the second carrier are then measured, and a determination is made by the controller as to whether the output power for the second carrier increases as the output power for the first carrier decreases.

These and other objects, features, and advantages of the present application are evident from the following description of one or more preferred embodiments, with reference to the accompanying drawings.

BRIEF DESCRIPTION OF THE DRAWINGS

FIG. 3 is a table, which summarizes the observations of allowed dropping or scaling behavior relative to existing dual carrier operation with dynamic power sharing;

DETAILED DESCRIPTION OF THE PREFERRED EMBODIMENT(S)

Figure 1:
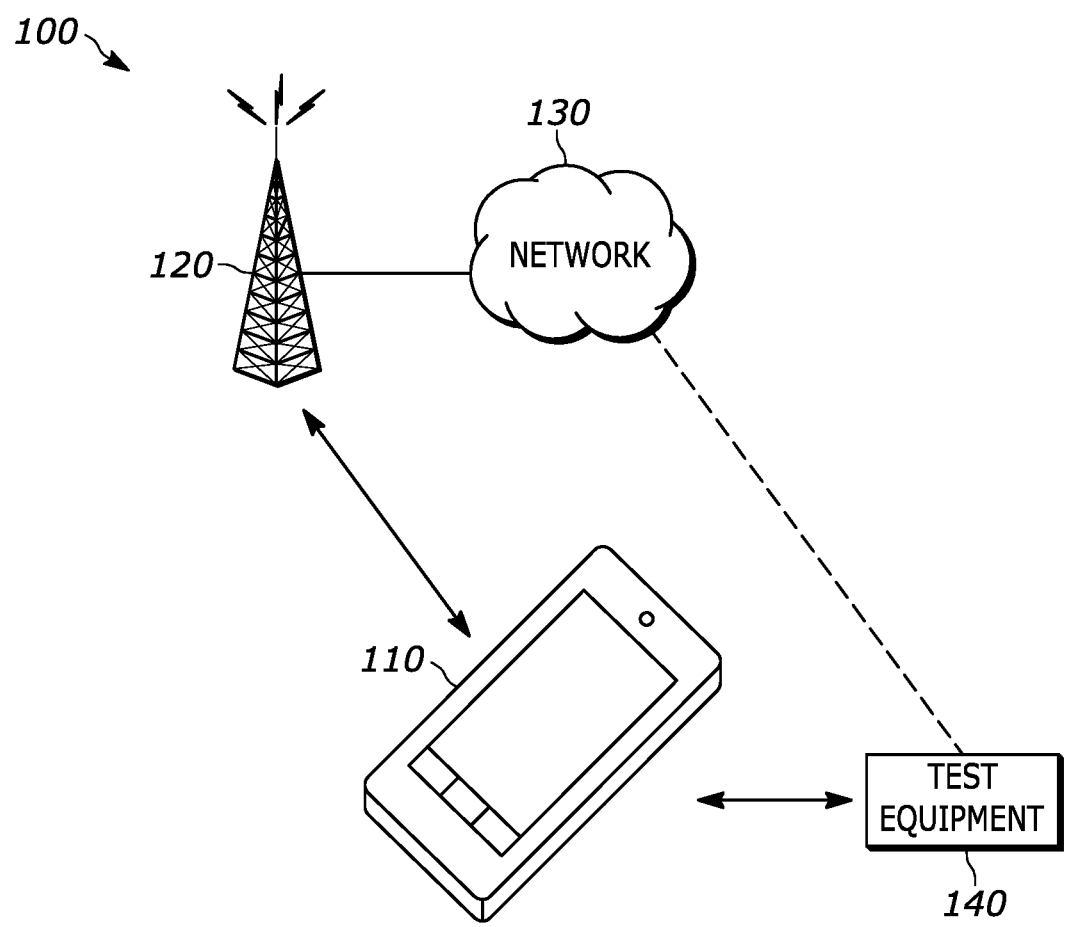
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for verification of dual carrier dynamic power sharing.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

The system 100 can further include test equipment 140, which in some instances could be coupled to and/or integrated as part of the network 130. The test equipment 140 is generally able to communicate with the wireless communication device 110 via a wired and/or a wireless connection, and can be used to verify at least part of the intended operation of the wireless communication device in an environment that might be better controlled including verification of dual carrier dynamic power sharing as well as an ability to prioritize a particular carrier transmission in the device. The test equipment can operate under the control of a controller, and can communicate with other devices and/or the network via a communication interface.

A mode of operation called EN-DC (E-UTRA—NR Dual-Carrier) has been defined in which the LTE carrier is the MCG (master cell group) and NR is the SCG (secondary cell group). EN-DC can be operated with or without dynamic power sharing. There are two primary objectives for EN-DC with dynamic power sharing:

Objective 1: Prioritize the master cell group or LTE carrier so that there is no degradation of the LTE carrier with respect to throughput or coverage due to the presence of the secondary cell group or NR carrier.

Objective 2: Make any power which is not needed by the master cell group, i.e. LTE carrier, available to the secondary cell group, i.e. NR carrier.

For EN-DC with dynamic power sharing, the limit on the sum power over both carriers is typically equal to the power limit on the carriers individually so that in an example where the sum power limit is 23 dBm $$P_{LTE}=P_{NR}=P_{ENDC}=23 \text{ dBm}$$

The alternative to dynamic power sharing is to divide the total power $P_{ENDC}$ between the two carriers so that the sum of the max powers is equal to $P_{ENDC}$. Two examples would be $$P_{LTE}=P_{NR}=20 \text{ dBm}, P_{LTE}+P_{NR}=23 \text{ dBm}$$

$$P_{LTE}=18 \text{ dBm}, P_{NR}=21.3 \text{ dBm}, P_{LTE}+P_{NR}=23 \text{ dBm}$$

At least one potential disadvantage of splitting the power in this fashion is that the maximum power on each carrier is reduced, and unused power on one carrier may not be able to be allocated to the other carrier.

In 3GPP Technical Specification 38.101-3, dynamic power sharing is supported in the sense that allowed maximum power reduction (MPR) and additional maximum power reduction (A-MPR) is specified as are definitions of the maximum configured power. However, the specification is in some ways imprecise so that it may be possible for a UE which does not support dynamic power sharing in the sense of Objective 2 to pass the existing requirements. At least one problem is that the UE may reserve power equal to Pcmax for the LTE carrier and may not release this power to the NR carrier even if the LTE transmit power is very low.

In order to address this weakness in the specification, it is herein proposed to change the MPR/A-MPR definitions and the configured maximum power definition so that only a UE which supports dynamic power sharing can pass the requirement. To that effect, a method and apparatus for verifying dynamic power sharing is similarly provided.

More specifically included in the present application are tests to verify that the UE supports dynamic power sharing. Two types of tests are proposed—one test is qualitative and the other is quantitative.

The qualitative test can be used both with the existing specification without any further proposed changes to MPR/A-MPR configured maximum power, and can also be used if proposed changes discussed herein are agreed to and made. This test is used to show that as the LTE power is reduced, that this power is made available to the NR carrier.

The quantitative test generally only applies if the changes that we have proposed for MPR/A-MPR and configured maximum power are agreed to and made in the implemented standards. The quantitative test can be used to better ensure that $P_{CMAX,L}$ for the NR carrier increases as the power transmitted on the LTE carrier decreases.

EN-DC with LTE prioritization and dynamic power sharing has generally not been verified previously. For single carrier or carrier aggregation (CA), it is verified that the UE can achieve $P_{CMAX,L}$ by giving the UE power up commands until the power no longer increases, after which the measured power is compared to $P_{CMAX,L}$. However relative to dual carrier operation, the situation may be more complicated as it may be necessary to show both that the LTE carrier is prioritized and that power which is unused by the LTE carrier is made available to the NR carrier. Given the current form of the existing standard, it is possible for a UE which does not support dynamic power sharing to prioritize LTE and still meet the $P_{CMAX,L}$ requirement for the NR carrier. Therefore, it may be beneficial to define a dynamic power sharing test which does not depend on $P_{CMAX,L}$ in order to verify that the UE supports dynamic power sharing.

In the TS 38.101-3 specification, the UE supporting dynamic power sharing is allowed to drop the SCG in the case that b=TRUE in 6.2B.4.1.1 and 6.2B.4.1.3, for intra-band and inter-band EN-DC, respectively, where the condition "b" depends only on $P_{CMAX}$ values for the E-UTRA and NR carriers and not on the actual transmitted power. As a consequence of this dropping criterion, it can be shown that the UE is often allowed to drop the SCG transmission even if no scaling of the SCG transmission power $\hat{P}_{SCG}(i_2)$ in slot $i_2$ is required to satisfy the inequality $$\hat{P}_{MCG}(i_1)+\hat{P}_{SCG}(i_2) \leq \hat{P}_{Total}^{EN-DC},$$

where $\hat{P}_{MCG}(i_1)$ is the MCG transmission power in slot $i_1$ and $\hat{P}_{Total}^{EN-DC}$ is the total configured maximum transmission power for EN-DC operation. However, since the UE is allowed to drop the SCG when scaling and dropping are not required to meet either emissions requirements or the total power constraint, this implies that the specification does not require the UE to implement dynamic power sharing (though it does allow it).

The present disclosure addresses how the definition of MPR/A-MPR and Pcmax for the SCG can be modified for intra-band EN-DC so as to limit dropping of the SCG to those instances in which dropping may be necessary to limit the combined transmit power to $\hat{P}_{Total}^{EN-DC}$ or to meet emissions requirements.

Dynamic Power Sharing for EN-DC in TS 38.213

The SCG scaling and dropping behavior for EN-DC is described in 3GPP TS 38.213 as below:

If the UE indicates a capability for dynamic power sharing between E-UTRA and NR for EN-DC and
 if UE transmission(s) in subframe $i_1$ of the MCG overlap in time with UE transmission(s) in slot $i_2$ of the SCG in FR1, and
 if $\hat{P}_{MCG}(i_1)+\hat{P}_{SCG}(i_2) > \hat{P}_{Total}^{EN-DC}$ in any portion of slot $i_2$ of the SCG,
  the UE reduces transmission power in any portion of slot $i_2$ of the SCG so that $\hat{P}_{MCG}(i_1)+\hat{P}_{SCG}(i_2) \leq \hat{P}_{Total}^{EN-DC}$ in any portion of slot $i_2$, where $\hat{P}_{MCG}(i_1)$ and $\hat{P}_{SCG}(i_2)$ are the linear values of the total UE transmission powers in subframe $i_1$ of the MCG and in slot $i_2$ of the SCG in FR1, respectively. The UE is not required to transmit in any portion of slot $i_2$ of the SCG if $\hat{P}_{SCG}(i_2)$ would need to be reduced by more than the value provided by $X_{SCALE}$ in order for $\hat{P}_{MCG}(i_1)+\hat{P}_{SCG}(i_2) \leq \hat{P}_{Total}^{EN-DC}$ in any portion of slot $i_2$ of the SCG. The UE is required to transmit in slot $i_2$ of the SCG if $\hat{P}_{SCG}(i_2)$ would not need to be reduced by more than the value provided by $X_{SCALE}$ in order for $\hat{P}_{MCG}(i_1)+\hat{P}_{SCG}(i_2) \leq \hat{P}_{Total}^{EN-DC}$ in all portions of slot $i_2$.

However, in the case of intra-band EN-DC, the configured maximum powers for the two carriers are not independent even without the limit on the total power $$\hat{P}_{MCG}(i_1)+\hat{P}_{SCG}(i_2) \leq \hat{P}_{Total}^{EN-DC}. \quad (1)$$

In particular, even before applying the limit on the total power, the transmission powers on each carrier must be less than their respective maximum configured powers, so that $$\hat{P}_{MCG}(i_1) \leq p_{CMAX\_E-UTRA,c}$$

and $$\hat{P}_{SCG}(i_2) \leq p_{CMAX\_NR,c}$$

where the configured maximum powers $P_{CMAX\_E-UTRA,c}$ and $p_{CMAX\_NR,c}$, in linear terms, are a function of the MPR/A-MPR that is allowed on each carrier. Depending on how MPR/A-MPR is defined for the SCG, it may be that $p_{CMAX\_NR,c}$ limits $\hat{P}_{SCG}(i_2)$ so that scaling by more than $X_{SCALE}$ is not needed, and thus dropping is not allowed.

For intra-band carrier aggregation, the MPR/A-MPR needed for each carrier is a function of the RB allocations on both carriers, and thus $P_{CMAX}$ for each carrier is a function of both RB allocations. Furthermore, the MPR/A-MPR needed on the SCG depends on the MPR/A-MPR taken on the MCG. Thus, in the case of intra-band carrier aggregation, the allowed dropping behavior described by "The UE is not required to transmit in any portion of slot $i_2$ of the SCG if $\hat{P}_{SCG}(i_2)$ would need to be reduced by more than the value provided by $X_{SCALE}$ in order for $\hat{P}_{MCG}(i_1)+\hat{P}_{SCG}(i_2) \leq \hat{P}_{Total}^{EN-DC}$ in any portion of slot $i_2$ of the SCG"

depends upon how MPR/A-MPR is defined for the SCG.
Concerns with the Existing SCG Scaling/Dropping Conditions in TS 38.101-3
The condition 'b' is defined for intra-band EN-DC in 6.2B.4.1.1 of 38.101-3 as $$b=10 \log_{10}[p_{CMAX\_E-UTRA,c}(p)+p_{CMAX,f,c,NR}(q)/X\_scale] > P_{EN-DC,tot\_L}$$

where $$P_{EN-DC,tot\_L}(p,q) = \text{MIN}\{P_{PowerClass,EN-DC} - \text{MAX}\{\text{MPR}_{tot}, \text{A-MPR}_{tot}\}, P_{EMAX,EN-DC}\}.$$

In the typical case that $P_{PowerClass,EN-DC} = P_{EMAX,EN-DC}$, it follows that $$P_{EN-DC,tot\_L}(p,q) = P_{PowerClass,EN-DC} - \text{MAX}\{\text{MPR}_{tot}, \text{A-MPR}_{tot}\}.$$

Dc_(N)71AA
For DC_(n)71AA when NS_35 is signaled, it can be observed that $\text{MPR}_{tot}=0$ and the minimum value of A-$\text{MPR}_{tot}$ for orthogonal frequency division multiplexing (OFDM) with dynamic power sharing is 6.5 dB (allocation ratio≥0.8), so that $$P_{EN-DC,tot\_L}(p,q) \leq P_{PowerClass,EN-DC}-6.5 \text{ dB}=16.5 \text{ dBm}.$$

Thus, for DC_(n)71, $P_{EN-DC,tot\_L}(p,q)$ is never more than 16.5 dBm.
Now, $P_{CMAX\_E-UTRA,c}(p)$ must be greater than or equal to $P_{CMAX\_L\_E-UTRA,c}$ which is given by $$P_{CMAX\_L\_E-UTRA,c} = \text{MIN}\{\text{MIN}(P_{EMAX,c}, P_{EMAX,EN-DC}, P_{LTE})-\Delta t_{C\_E-UTRA,c}, (P_{PowerClass}-\Delta P_{PowerClass})-\text{MAX}(\text{MPR}_c+\text{A-MPR}_c+\Delta T_{IB,c}+\Delta T_{C\_E,UTRA,c}+\Delta T_{ProSe}, P-\text{MPR}_c)\}$$

If $$P_{EMAX,c}=P_{EMAX,EN-DC}=P_{LTE}=P_{PowerClass}$$

and $$\Delta T_{IB,c} = \Delta T_{C\_E\text{-}UTRA,c} = \Delta T_{ProSe} = P\text{-}MPR_c = \Delta P_{PowerClass} = 0,$$

then $$P_{CMAX\_L\_E\text{-}UTRA,c} = P_{PowerClass} - (MPR_c + A\text{-}MPR_c)$$

Since, no A-MPR is defined for LTE Band 71, it follows that $$P_{CMAX\_L\_E\text{-}UTRA,c} \geq P_{PowerClass} - MPR_c = 23 \text{ dBm} - 5 \text{ dB} = 18 \text{ dBm}$$

where the maximum $MPR_c$ of 5 dB is only allowed for 256-QAM, and otherwise is 3 dB or less. As a result, it must be that $$P_{CMAX\_E\text{-}UTRA,c}(p) \geq 18 \text{ dBm}$$

from which it follows that $$10 \log_{10}[p_{CMAX\_E\text{-}UTRA,c}(p) + p_{CMAX,f,c,NR}(q)/X\_scale] \geq 10 \log_{10}[p_{CMAX\_E\text{-}UTRA,c}(p)] \geq 18 \text{ dBm}$$

Since $P_{EN\text{-}DC,tot\_L}(p,q) \leq 16.5$ dBm, it follows that condition 'b' given by $$b = 10 \log_{10}[p_{CMAX\_E\text{-}UTRA,c}(p) + p_{CMAX,f,c,NR}(q)/X\_scale] > P_{EN\text{-}DC,tot\_L}$$

is always TRUE regardless of the value of X_scale. Thus, for DC_(n)71, the UE is always allowed to drop the SCG transmission when there is an MCG transmission, and this is true regardless of the RB allocations, the value of X_scale, and the actual transmission power on the MCG, $\hat{P}_{MCG}$.

General Intra-Band Non-Contiguous EN-DC

For the general intra-band non-contiguous case, the $MPR_{ENDC}$ is never less than 15 dB so that $MPR_{tot} = 12$ dB. In the case that $P_{LTE} = P_{NR} = P_{ENDC} = 23$, we have $$P_{EN\text{-}DC,tot\_L}(p,q) \leq P_{PowerClass,EN\text{-}DC} - 12 \text{ dB} = 11 \text{ dBm}.$$

With the same assumptions as above and in the absence of NS signaling, it follows that $$P_{CMAX\_L\_E\text{-}UTRA,c} \geq P_{PowerClass} - MPR_c = 23 \text{ dBm} - 5 \text{ dB} = 18 \text{ dBm}$$

and thus $$P_{CMAX\_E\text{-}UTRA,c}(p) \geq 18 \text{ dBm}$$

where the maximum $MPR_c$ of 5 dB is only allowed for 256-QAM, and is otherwise 3 dB or less. As a result, condition 'b' given by $$b = 10 \log_{10}[p_{CMAX\_E\text{-}UTRA,c}(p) + p_{CMAX,f,c,NR}(q)/X\_scale] > P_{EN\text{-}DC,tot\_L}$$

is always TRUE and the UE is always allowed to drop the SCG transmission when there is an MCG transmission, and this is true regardless of the RB allocations, the value of X_scale, and the actual transmission power on the MCG, $\hat{P}_{MCG}$.

General Intra-Band Contiguous EN-DC

For the general intra-band contiguous case, the $MPR_{ENDC}$ is never less than 6 dB so that $MPR_{tot} = 3$ dB. In the case that $P_{LTE} = P_{NR} = P_{ENDC} = 23$, we have $$P_{EN\text{-}DC,tot\_L}(p,q) \leq P_{PowerClass,EN\text{-}DC} - 3 \text{ dB} = 20 \text{ dBm}.$$

With the same assumptions as above and in the absence of NS signaling, it follows that as long as the modulation order is 64-QAM or less, then $$P_{CMAX\_L\_E\text{-}UTRA,c} \geq P_{PowerClass} - MPR_c = 23 \text{ dBm} - 3 \text{ dB} = 20 \text{ dBm}$$

Thus, in the case that MCG modulation is 64-QAM or less, then $$P_{CMAX\_E\text{-}UTRA,c}(p) \geq 20 \text{ dBm}$$

and $$10 \log_{10}[p_{CMAX\_E\text{-}UTRA,c}(p) + p_{CMAX,f,c,NR}(q)/X\_scale] > P_{EN\text{-}DC,tot\_L}(p,q)$$

and the SCG can be dropped for any positive finite value of X_scale.

So, if the modulation for the MCG is 64-QAM or less for the general intra-band contiguous EN-DC case, the UE is always allowed to drop the SCG transmission when there is an MCG transmission, and this is true regardless of the RB allocations, the value of X_scale, and the actual transmission power on the MCG, $\hat{P}_{MCG}$.

General Inter-Band EN-DC

For general inter-band EN-DC, the conditions 'a' and 'b' are given by $$a = 10 \log_{10}[p_{CMAX\_E\text{-}UTRA,c}(p) + p_{CMAX,f,c,NR}(q)] > P\_EN\text{-}DC\_Total$$

$$b = 10 \log_{10}[p_{CMAX\_E\text{-}UTRA,c}(p) + p_{CMAX,f,c,NR}(q)/X\_scale] > P\_EN\text{-}DC\_Total$$

where scaling is allowed if a=TRUE and b=FALSE, and dropping is allowed if b=TRUE.

Figure 2:
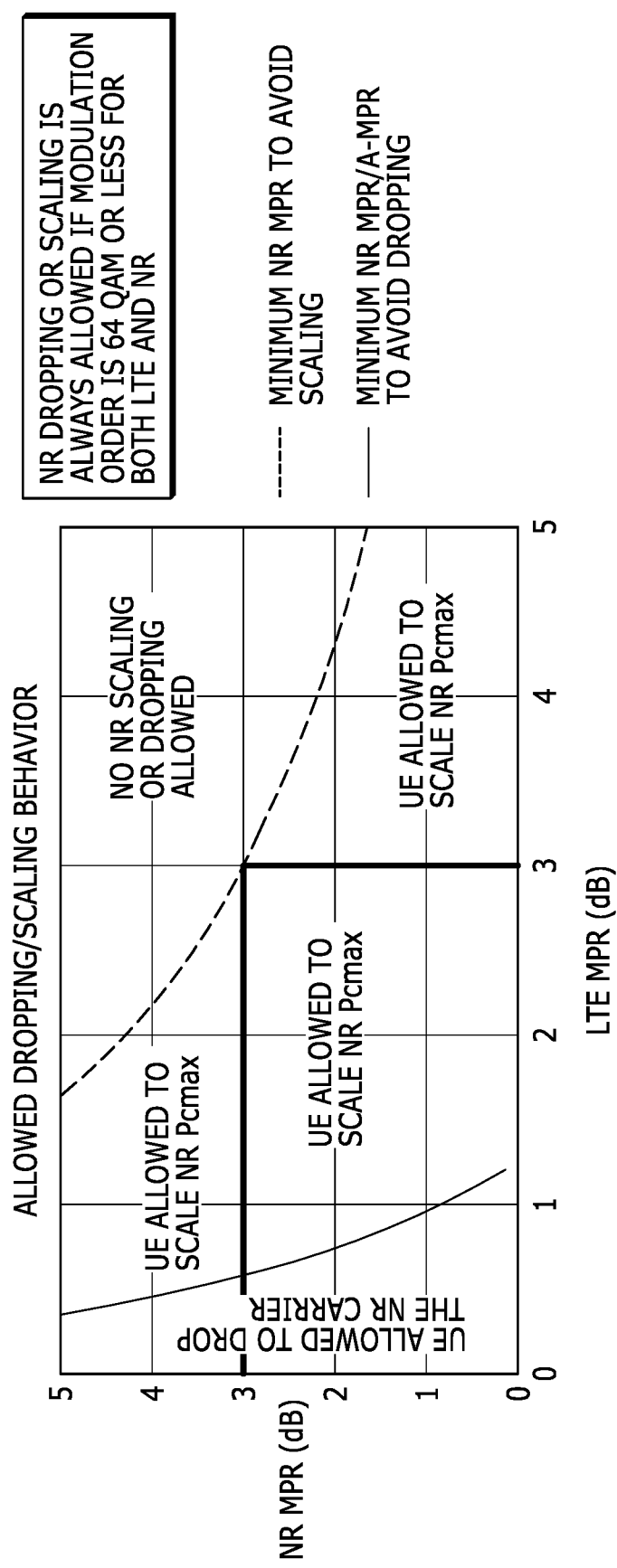
FIG. 2 is a graph illustrating previously allowed dropping or scaling behavior relative to general inter-band dual carrier operation, per the guidelines outlined in the existing standards.

In the general case without network signaling (NS), there is no A-MPR and the allowed MPR depends on the modulation used on each of the carriers. The UE's allowed scaling and dropping behavior for the SCG is shown in FIG. 2 for the case that $P_{LTE} = P_{NR} = P_{ENDC} = 23$ dB. From the graph 200 illustrated in FIG. 2, which shows allowed scaling and dropping behavior for general inter-band EN-DC, it can be observed that the UE is always allowed to scale or drop the SCG (NR) carrier if the modulation order on both carriers is less than or equal to 64-QAM. The UE is only required to transmit the NR carrier in the region above the blue line, and in this region at least the MCG (LTE) and/or the SCG (NR) must be transmitting 256-QAM so that the allowed MPR on one of the two carriers is greater than 3 dB.

Observations on Allowed NR Dropping and Scaling Behavior

From the above discussion, we have the following four observations.

Observation 1: For DC_(n)71AA, the UE is always allowed to drop the SCG transmission when there is an MCG transmission, and this is true regardless of the RB allocations, the modulations, the value of X_scale, and the actual transmission power on the MCG, $\hat{P}_{MCG}$.

Observation 2: For the general intra-band non-contiguous EN-DC case, the UE is always allowed to drop the SCG transmission when there is an MCG transmission, regardless of the RB allocations, the modulations, the value of X_scale, and the actual transmission power on the MCG, $\hat{P}_{MCG}$.

Observation 3: For the general intra-band contiguous EN-DC case, if the modulation for the MCG is 64-QAM or less, the UE is always allowed to drop the SCG transmission when there is an MCG transmission, and this is true regardless of the RB allocations, the value of X_scale, and the actual transmission power on the MCG, $\hat{P}_{MCG}$.

Observation 4: For the general inter-band EN-DC case, if the order of the modulation for both the MCG and SCG is 64-QAM or less, the UE is always allowed to scale the SCG transmission when there is an MCG transmission (and is in some cases allowed to drop the SCG transmission), and this is true regardless of the RB allocations, the value of X_scale, and the actual transmission power on the MCG, $\hat{P}_{MCG}$.

The summary of the above observations can be found in the table 300 illustrated in FIG. 3, which includes a summary of the allowed scaling/dropping behavior for EN-DC with dynamic power sharing.

In the cases above in which the UE is allowed to drop or scale the NR carrier no matter how little power is transmitted on the MCG and no matter how much power is available to the SCG, the current scaling and dropping rules "a" and "b" do not require dynamic power sharing between the two carriers.

What are the Objectives of Dynamic Power Sharing for EN-DC?

At least two objectives of dynamic power sharing for EN-DC seem to be the following:

Objective 1: Prioritize the LTE carrier so that there is no degradation of the LTE carrier due to the presence of the NR carrier.

Objective 2: Make any power which is not needed by the LTE carrier available to the NR carrier.

While the first objective is met with the current scaling and dropping rules, Objective 2 may not be met. In the examples above, it was shown that the dynamic power sharing UE is allowed to drop the NR carrier in cases where no scaling or dropping of the NR carrier is needed to meet either emissions requirements or the total power constraint.

As a specific example, we again consider the general intra-band contiguous case discussed in Section 3.3 above. For this case, the minimum value of $MPR_{tot}=3$ dB. In the case that $P_{LTE}=P_{NR}=P_{ENDC}=23$, we have $$P_{EN\text{-}DC,tot\_L}(p,q) \leq P_{PowerClass,EN\text{-}DC} - 3 \text{ dB}=20 \text{ dBm}.$$

Since $MPR_{tot}$ is the maximum power reduction, the total power available to the LTE and NR carriers is at least 20 dBm. As noted above, the UE is allowed to drop the NR carrier if the modulation order of the LTE carrier is 64-QAM or less. Now if the LTE carrier has a small allocation and so transmits only 13 dBm of power, there is at least 19 dBm of power available for the NR carrier, and yet with the current scaling and dropping rules, the UE is allowed to drop the NR carrier if the modulation order of the LTE carrier is 64-QAM or less.

It can be observed that the current $P_{CMAX}$-based scaling and dropping rules are consistent with an EN-DC radio which only knows the RB allocation and the modulation of the LTE carrier and does not know the actual transmit power $\hat{P}_{MCG}$. However, if the UE does not know the LTE power $\hat{P}_{MCG}$ at the time it configures the power for the NR carrier, then it cannot implement dynamic power sharing in the sense of Objective 2. As a result, the UE reserves the maximum power for the LTE carrier consistent with its RB allocation and modulation, even if the LTE modem is actually transmitting at a much lower power level so that the scaling and dropping rules for the SCG are independent of the actual MCG transmission power $\hat{P}_{MCG}$.

From the above discussion, while the current scaling and dropping rules do prioritize the LTE carrier and do allow dynamic power sharing, they do not require dynamic power sharing, and it is thus possible for a UE which does not support dynamic power sharing in the sense of Objective 2 to meet the scaling and dropping requirements.

Alternative Definitions of the SCG MPR/A-MPR and Pcmax for EN-DC

As discussed in R4-1904676, entitled "On the SCG MPR/A-MPR and Pcmax for EN-DC with Dynamic Power Sharing", Motorola Mobility, RAN4 #90, April, 2019, there may be multiple alternative options for defining MPR/A-MPR for the SCG and for enforcing the total power constraint. For inter-band EN-DC, the MPR/A-MPR values can be defined independently for the two carriers to meet emissions requirements as is currently done in 3GPP Technical Specification 38.101-3. In particular, the SCG MPR/A-MPR is chosen to be the stand-alone MPR/A-MPR defined for the NR carrier in 3GPP TS 38.101-1.

Defining the SCG MPR/A-MPR for Intra-Band EN-DC

For intra-band EN-DC, the situation may be more complicated. As currently implemented in 3GPP TS 38.101-3, the SCG MPR/A-MPR that is defined is not sufficient on its own to ensure that all emissions requirements are met, and as a result, the power reduction needed to meet emissions requirements is enforced by subtracting the total MPR/A-MPR from the total power constraint $\hat{P}_{Total}^{EN\text{-}DC}$ and using conditions 'a' and 'b' to determine if dropping or scaling of the NR carrier are allowed. However, as has been observed in Sections 3.1-3.3 above, this approach allows the UE to scale and/or drop the NR carrier even when no scaling or dropping is needed in order to meet either emissions constraints or the total power constraint. As a result, in many cases, the UE is allowed to drop the NR carrier whenever there is an LTE transmission.

In R4-1904676, three options were presented for defining MPR/A-MPR. Of these three options, at least one preferred option was Option 3, as described below.

Option 3: The SCG MPR/A-MPR is chosen as the power reduction necessary to ensure the emissions requirements are met. In this case, the MPR/A-MPR for the SCG is defined as the difference between $P_{PowerClass,EN\text{-}DC}$ and the remaining power, where the remaining power is the difference between $P_{PowerClass,EN\text{-}DC}$ reduced by the total MPR/A-MPR and $\hat{P}_{MCG}$, the transmission power on the MCG (not the maximum configured power).

With Option 3, it is no longer necessary to reduce $P_{EN\text{-}DC,tot\_L}$ by $MAX\{MPR_{tot}, A\text{-}MPR_{tot}\}$ in order to meet emissions requirements, so instead $$P_{EN\text{-}DC,tot\_L}(p,q)=MIN\{P_{PowerClass,EN\text{-}DC}, P_{EMAX,EN\text{-}DC}\}$$

which is the same as for inter-band EN-DC.

In 38.101-3, the MPR/A-MPR for the SGG does not depend on $\hat{P}_{MCG}$. However, the existing SCG MPR/A-MPR currently depends on the modulation and the RB allocation for the MCG. Furthermore, the value of the $\hat{P}_{MCG}$ can be determined at the same time as the RB allocation for the MCG, and so it seems reasonable that the MPR/A-MPR, $P_{CMAX\_L,NR}$, and $P_{CMAX\_H,NR}$ for the SCG can be defined so that they depend on $\hat{P}_{MCG}$, also.

Proposal 1: For intra-band EN-DC, define MPR/A-MPR for the SCG as in Option 3.

The changes needed to the MPR/A-MPR definitions in 3GPP TS 38.101-3 for Proposal 1 are shown below.

Defining Pcmax for the SCG for Both Intra-Band and Inter-Band EN-DC

With the modification of A-MPR for the SCG in Proposal 1 and the resulting value of $P_{CMAX\_L,f,c,NR}$, the SCG is allowed to take only enough MPR/A-MPR to ensure that emissions requirements can be met. However, there is still the possibility that the total power can exceed the total power limit $\hat{P}_{Total}^{EN\text{-}DC}$. To prevent this possibility, the total power constraint can be added to the definition of $P_{CMAX\_H,f,c,NR}$ as in Proposal 2.

Proposal 2: For intra-band EN-DC, define $P_{CMAX\_H,f,c,NR}$ as if $\hat{P}_{MCG} < 10^{\wedge}(\text{MIN}\{P_{EMAX,EN-DC}, P_{PowerClass} - \Delta P_{PowerClass}\}/10) P_{CMAX\_H,f,c,NR} = \text{MIN}\{10*\log 10(10^{\wedge}(\text{MIN}\{P_{EMAX,EN-DC}, P_{PowerClass} - \Delta P_{PowerClass}\}/10 - \hat{P}_{MCG}), P_{EMAX,c}, P_{NR})$ else $P_{CMAX\_H,f,c,NR} = -\text{infinity}$ (alternatively, state that NR transmission must be dropped)

where $\hat{P}_{MCG}$ is the configured output power for the MCG in linear terms For inter-band EN-DC, define $P_{CMAX\_H,f,c,NR}$ as if $\hat{P}_{MCG} < 10^{\wedge}(\text{MIN}\{P_{EMAX,EN-DC}, P_{PowerClass,EN-DC} - \Delta PO_{PowerClass,EN-DC}\}/10) P_{CMAX\_H,f,c,NR} = \text{MIN}\{10*\log 10(10^{\wedge}(\text{MIN}\{P_{EMAX,EN-DC}, P_{PowerClass,EN-DC} - \Delta P_{PowerClass,EN-DC}\}/10) - \hat{P}_{MCG}) P_{NR}, P_{PowerClass} - \Delta P_{PowerClass}\}$ else $P_{CMAX\_H,f,c,NR} = -\text{infinity}$ (alternatively, state that NR transmission must be dropped)

where $\hat{P}_{MCG}$ is the configured output power for the MCG in linear terms With these change, the total power constraint is enforced on the SCG, and if necessary, the SCG transmission is dropped.

Figure 4:
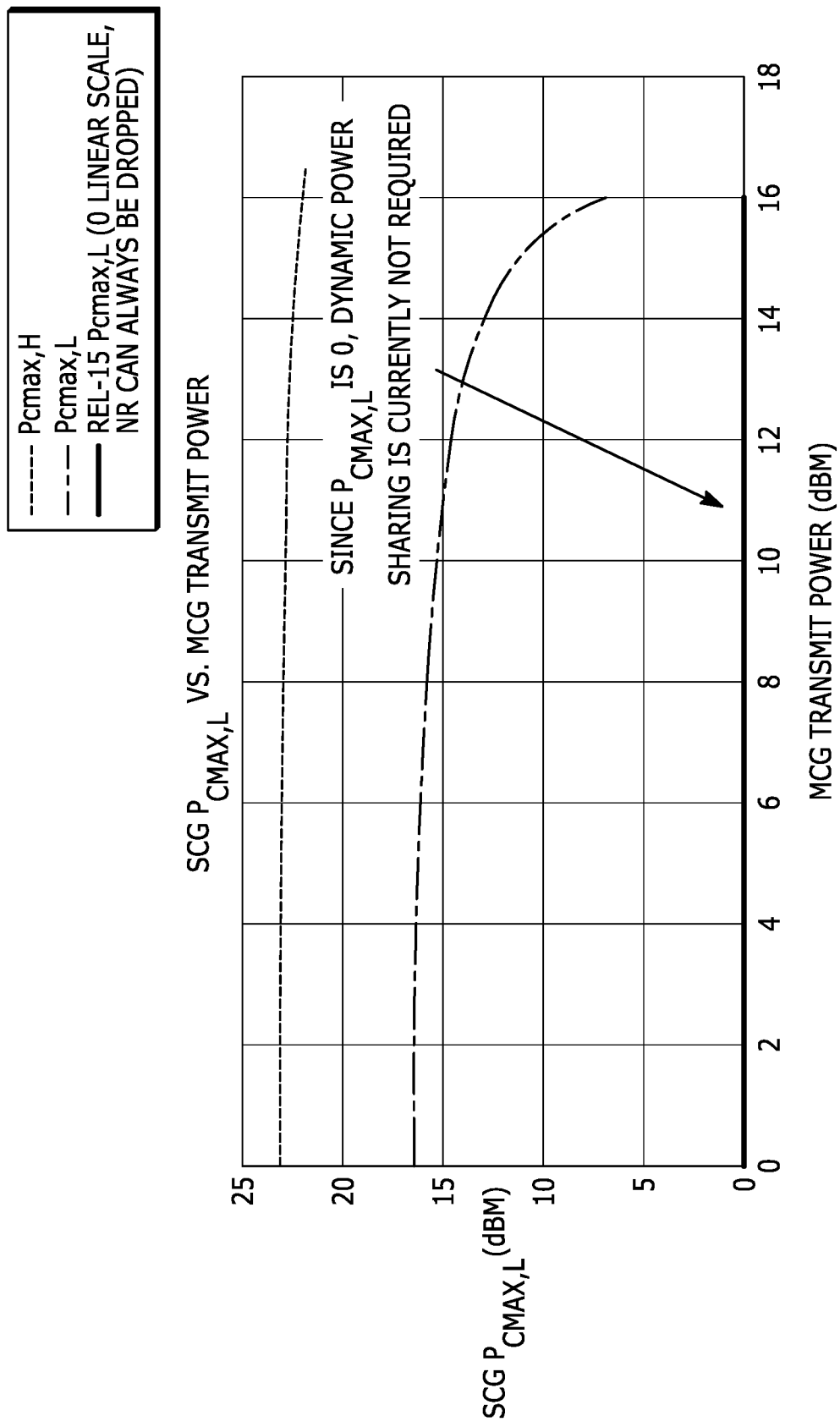
FIG. 4 is a graph of secondary cell group (SCG) Pcmax,L and Pcmax,H vs. master cell group (MCG) transmit power for DC_(n)71 with Proposals 1 and 2.

In the graph 400 of FIG. 4, $P_{CMAX\_L,NR}$ and $P_{CMAX\_H,NR}$ are shown for DC_(n)71 with Proposals 1 and 2, respectively, as a function of MCG transmission power $\hat{P}_{MCG}$ for a full allocation for which the total A-MPR is 6.5 dB (CP-OFDM). As noted above, with the existing standard, the UE is always allowed to drop the SCG and so for the existing standard, the minimum power for the SCG is no power at all.

Examples of the changes needed to be made to the existing standard to implement Proposals 1 and 2 are provided below.

It should be noted that with Proposals 1 and 2, there is no specific dropping criteria for the SCG other than the SCG may be dropped if $P_{CMAX,L,NR}$ (linear terms) is 0, and the SCG must be dropped if $P_{CMAX,H,NR}$ (linear terms) is 0. As a result, for intra-band EN-DC it may be useful to have another dropping criteria such as a threshold power or power spectral density (PSD) below which the SCG may be dropped. Alternatively, a dropping threshold could be defined for the maximum PSD difference between the MCG and the SCG as is currently in the specification for intra-band EN-DC.

In accordance with at least some embodiments, we have proposed three tests to verify LTE prioritization and dynamic power sharing. It should be noted that with LTE prioritization, it may not be possible to test dynamic power sharing when the LTE transmitter is power-controlled to maximum power since the NR carrier may in some cases be dropped. Furthermore, it should be noted that simultaneous transmission is not sufficient to prove dynamic power sharing.

Verification of Dynamic Power Sharing

With the changes proposed above, $P_{CMAX,L}$ and $P_{CMAX,H}$ for the NR carrier are now a function of the actual transmit power on the LTE carrier $\hat{P}_{MCG}$. While the test equipment knows the RB allocation and the modulation for both carriers, it does not a priori know the value of $\hat{P}_{MCG}$, since this value is determined internally by the UE in accordance with the allowed MPR/A-MPR and the power control commands that are received. Thus, the value of the value of $\hat{P}_{MCG}$ must be measured by the test equipment.

It should be noted that simultaneous transmission on both LTE and NR is not sufficient to demonstrate dynamic power sharing as simultaneous transmission is also present without dynamic power sharing. What should be demonstrated in testing is that both of the objectives given above are met. In particular, it should be demonstrated that both i) the LTE carrier is prioritized so that there is no degradation of the LTE carrier due to the presence of the NR carrier.

ii) any power which is not needed by the LTE carrier is made available to the NR carrier.

To test the first condition, the UE is assigned RB allocations and modulation types for both the LTE and NR carriers. The UE is then given continuous 'up' power control commands on both the LTE and NR carriers until the output power on the LTE and NR carriers reach steady state. The measured output power for the LTE carrier should be greater than the stand alone $P_{CMAX,L}$ in 3GPP TS 36.101 for the given RB allocation and modulation type. As for the NR carrier, the measured power should be greater than $P_{CMAX,L}$ as specified in Proposal 1, which is a function of $\hat{P}_{MCG}$ and which can be measured by the test equipment. In some cases, it may be that $P_{CMAX,L}$ for NR is 0 in linear terms so that the NR transmission can be dropped.

To test dynamic power sharing, the UE is assigned RB allocations and modulation types for both the LTE and NR carriers. Similarly, UE is then given continuous 'up' power control commands on both the LTE and NR carriers until the output power on the LTE and NR carriers reach steady state. At this point, the UE is given several "down" power control commands on LTE after which the UE is given "up" commands for the NR carrier until steady state is achieved. As a minimum requirement, the measured NR transmit power should go up as the LTE transmit power goes down. If this condition is not met, it means that the UE does not know the value (or have an estimate) of $\hat{P}_{MCG}$ for the LTE carrier and thus cannot make the unused LTE power available to the NR carrier. Furthermore, it means that the UE does not support dynamic power sharing even if it does support LTE prioritization and dual transmission.

Two types of test requirements can be considered for dynamic power sharing:

i) A qualitative requirement in which the measured NR transmit power should increase as the measured LTE power decreases. For this requirement, the UE is given power 'up' commands for both the LTE and NR carriers until the output power reaches steady state. The power is measured for both the LTE and NR carriers. The UE is then given several "down" power control commands for LTE after which it is given continuous "up" power control commands for NR. After the NR power reaches steady state, the measured NR power is recorded. As the LTE power is reduced with each set of "down" power control commands (after which the UE is given "up" power commands for the NR carrier until steady state is achieved) the measured NR power should increase in order to meet the qualitative requirement.

ii) A quantitative requirement in which the measured NR power is compared to $P_{CMAX,L}$ for the NR carrier. For this requirement, $P_{CMAX,L}$ for the NR carrier is determined from a measurement of $\hat{P}_{MCG}$ for the LTE carrier in accordance with Proposal 1. The UE is given continuous "up" power control commands for the NR carrier until the NR output power reaches steady state. The measured NR power should then be greater than $P_{CMAX,L}$ for the NR carrier in order to meet the quantitative requirement.

Even if Proposals 1 and 2 in this contribution are not agreed, a qualitative dynamic power sharing test as described in (i) should be agreed so that it can be guaranteed that at least some portion of the unused LTE power is made available to the NR carrier. Otherwise, there is no guarantee that dynamic power sharing is implemented by the UE.

Proposal 3: It is further proposed to introduce a qualitative dynamic power sharing test to ensure that for a given pair of allocations on the LTE and NR carriers, as the LTE power is decreased, the maximum NR power is increased.

EN-DC with LTE prioritization and dynamic power sharing has not been verified previously. In the present filing a test has been proposed for verifying LTE prioritization by power by sending the UE up commands for both the LTE and NR carriers until steady state is achieved, at which point the measured LTE power should exceed $P_{CMAX,L}$ for LTE in the stand-alone LTE specification TS 36.101 for the same RB allocation and modulation.

In order to test dynamic power sharing, several tests are defined which verify that when the NR carrier is sent continuous "up" power control commands, the NR carrier power increases as the LTE power decreases. In order for the UE to meet this condition, the UE may need to know the actual LTE transmit power $\hat{P}_{MCG}$ and not just $P_{CMAX}$ for the given LTE RB allocation and modulation type so that the UE can determine how much power that was initially reserved for the LTE carrier can be made available to the NR carrier.

In the present filing, it has been shown that there may be problems with the current implementation of dynamic power sharing for intra-band EN-DC in that the UE is often allowed to drop the SCG transmission even if no scaling of the UE SCG transmission power $\hat{P}_{SCG}(i_2)$ in slot $i_2$ is required to satisfy the inequality $$\hat{P}_{MCG}(i_1)+\hat{P}_{SCG}(i_2)\leq \hat{P}_{Total}^{EN-DC},$$

To address this problem, it has been proposed that the MPR/A-MPR for the SCG be modified as in Proposal 1 and that $P_{CMAX\_H,NR}$ for the SCG be modified as in Proposal 2.

Proposal 1: For intra-band EN-DC, define MPR/A-MPR for the SCG as in Option 3 and below.

Proposal 2: For intra-band EN-DC, define $P_{CMAX\_H,f,c,NR}$ as if $\hat{P}_{MCG}<10^{\wedge}(MIN\{P_{EMAX,EN-DC}, P_{PowerClass}-\Delta P_{PowerClass}\}/10)$ $P_{CMAX\_H,f,c,NR}=MIN\{10^{*}\log 10(10^{\wedge}(MIN\{P_{EMAX,EN-DC}, P_{PowerClass}-\Delta P_{PowerClass}\}/10)-\hat{P}_{MCG}), P_{EMAX,c}, P_{NR})$ else $P_{CMAX\_H,f,c,NR}=-$infinity (alternatively, state that NR transmission must be dropped)

where $\hat{P}_{MCG}$ is the configured output power for the MCG in linear terms.

For inter-band EN-DC, define $P_{CMAX\_H,f,c,NR}$ as if $\hat{P}_{MCG}<10^{\wedge}(MIN\{P_{EMAX,EN-DC}, P_{PowerClass,EN-DC}-\Delta P_{PowerClass,EN-DC}\}/10)$
$P_{CMAX\_H,f,c,NR}=MIN\{10^{*}\log 10(10^{\wedge}(MIN\{P_{EMAX,EN-DC}, (P_{PowerClass,EN-DC}-\Delta P_{PowerClass,EN-DC})\}/10)-\hat{P}_{MCG}), P_{EMAX,c}, P_{NR}, (P_{PowerClass}-\Delta P_{PowerClass})\}$ else $P_{CMAX\_H,f,c,NR}=-$infinity (alternatively, state that NR transmission must be dropped)

where $\hat{P}_{MCG}$ is the configured output power for the MCG in linear terms Since the current dynamic power sharing requirements are not sufficient to ensure that the UE supports dynamic power sharing, the following proposal could also be agreed.

Proposal 3: At a minimum, introduce a qualitative dynamic power sharing test to ensure that for a given pair of allocations on the LTE and NR carriers, as the LTE power is decreased, the maximum NR power is increased.

Some examples of how the requirements for user equipment that supports dynamic power sharing can be modified in 3GPP TS 38.101-3 is shown below.

Example 1

6.2B.2 UE Maximum Output Power Reduction for EN-DC
6.2B.2.0 General
The UE maximum output power reduction (MPR) specified in this subclause is applicable for UEs configured with EN-DC when NS_01 is indicated in the MCG and the SCG. The MPR applies subject to indication in the field modifiedMPRbehavior for the SCG in accordance with 3GPP TS 38.101-1: "NR; User Equipment (UE) radio transmission and reception; Part 1: Range 1 Standalone".
6.2B.2.1 Intra-Band Contiguous EN-DC
6.2B.2.1.1 General
When the UE is configured for intra-band contiguous EN-DC, the UE determines the total allowed maximum output power reduction as specified in this subclause.
For UE supporting dynamic power sharing the following:
for the MCG, $MPR_c$, in accordance with 3GPP TS 36.101: "Evolved Universal Terrestrial Radio Access (E-UTRA); User Equipment (UE) radio transmission and reception"
for the SCG, $MPR_{NR}=MAX(MPR_{single,NR}, MPR_{ENDC})$ if $10^{*}\log_{10}(\hat{P}_{MCG})<P_{PowerClass,EN-DC}-MPR_{tot}$, then $MPR'_c=MIN(P_{EMAX,c}, P_{EMAX,EN-DC}, P_{NR})-10^{*}\log_{10}(10^{\wedge}((P_{PowerClass,EN-DC}-MPR_{tot})/10)-\hat{P}_{MCG})$ else $MPR'_c=$infinity, where $\hat{P}_{MCG}$ is the configured output power for the MCG in linear terms
for the total configured transmission power, $MPR_{tot}=P_{PowerClass,EN-DC}-\min(P_{PowerClass,EN-DC}, 10^{*}\log_{10}(10^{\wedge}((P_{PowerClass,E-UTRA}-MPR_{E-UTRA})/10)+10^{\wedge}((P_{PowerClass,NR}-MPR_{NR})/10))$ where $MPR_{E-UTRA}=MAX(MPR_{single,E-UTRA}, MPR_{ENDC})$ with
$MPR_{single,E-UTRA}$ is the MPR defined for the E-UTRA transmission in accordance with 3GPP TS 36.101
$MPR_{single,NR}$ is the MPR defined for the NR transmission in accordance with 3GPP TS 38.101-1

For UEs not supporting dynamic power sharing the following
for the MCG, $MPR_c=MAX(MPR_{single,E-UTRA}, MPR_{ENDC})$ for the SCG, $MPR'_c=MAX(MPR_{single,NR}, MPR_{ENDC})$ where $MPR_{single,NR}$ is the MPR defined for the NR transmission in accordance with 3GPP TS 38.101-1

$MPR_{single,E-UTRA}$ is the MPR defined for the E-UTRA transmission in accordance with 3GPP TS 36.101

$MPR_{ENDC}$ is defined in Subclause 6.2B.2.1.2

6.2B.2.1.2 MPR for Power Class 3 and Power Class 2

Example 2

6.2B.2.2 Intra-Band Non-Contiguous EN-DC
6.2B.2.2.1 General

When the UE is configured for intra-band non-contiguous EN-DC, the UE determines the total allowed maximum output power reduction as specified in this subclause.

For UE supporting dynamic power sharing the following:
for the MCG, $MPR_c$ in accordance with 3GPP TS 36.101
for the SCG, $$MPR_{NR}=MAX(MPR_{single,NR}, MPR_{ENDC}) \text{ if } 10*\log_{10}(\hat{P}_{MCG}) < P_{PowerClass,EN-DC} - MPR_{tot},$$

then $$MPR'_c = MIN(P_{EMAX,c}, P_{EMAX,EN-DC}, P_{NR}) - 10*\log_{10}(10^{((P_{PowerClass,EN-DC} - MPR_{tot})/10)} - \hat{P}_{MCG})$$

else $MPR'_c = \text{infinity}$, where $\hat{P}_{MCG}$ is the configured output power for the MCG in linear terms for the total configured transmission power, $$MPR_{tot} = P_{PowerClass,EN-DC} - \min(P_{PowerClass,EN-DC}, 10*\log_{10}(10^{((P_{PowerClass,E-UTRA} - MPR_{E-UTRA})/10)} + 10^{((P_{PowerClass,NR} - MPR_{NR})/10)}))$$

where $$MPR_{E-UTRA} = MAX(MPR_{single,E-UTRA}, MPR_{ENDC})$$

with $MPR_{single,E-UTRA}$ is the MPR defined for the E-UTRA transmission in accordance with 3GPP TS 36.101

$MPR_{single,NR}$ is the MPR defined for the NR transmission in accordance with 3GPP TS 38.101-1

For UEs not supporting dynamic power sharing the following
for the MCG, $$MPR_c = MAX(MPR_{single,E-UTRA}, MPR_{ENDC})$$

for the SCG, $$MPR'_c = MAX(MPR_{single,NR}, MPR_{ENDC})$$

where $MPR_{single,NR}$ is the MPR defined for the NR transmission in accordance with 3GPP TS 38.101-1

$MPR_{single,E-UTRA}$ is the MPR defined for the E-UTRA transmission in accordance with 3GPP TS 36.101

$MPR_{ENDC}$ is defined in Subclause 6.2B.2.2.2

6.2B.2.2.2 MPR for Power Class 3 and Power Class 2

Example 3

6.2B.3.1.1 A-MPR for DC_(n)71AA

For UE supporting dynamic power sharing the following:
for the MCG, $A\text{-}MPR_c$ in accordance with 3GPP TS 36.101
for the SCG, if $10*\log_{10}(\hat{P}_{MCG}) < P_{PowerClass,EN-DC} - A\text{-}MPR_{tot}$, then $$A\text{-}MPR'_c = MIN(P_{EMAX,c}, P_{EMAX,EN-DC}, P_{NR}) - 10*\log_{10}(10^{((P_{PowerClass,EN-DC} - A\text{-}MPR_{tot})/10)} - \hat{P}_{MCG})$$

else $A\text{-}MPR'_c = \text{infinity}$, where $\hat{P}_{MCG}$ is the configured output power for the MCG in linear terms for the total configured transmission power, $A\text{-}MPR_{tot} = A\text{-}MPR_{DC}$ with $A\text{-}MPR_{DC}$ as defined in this sub-clause.

For UEs not supporting dynamic power sharing the following
for the MCG, $$A\text{-}MPR_c = A\text{-}MPR_{LTE}$$

for the SCG, $$A\text{-}MPR'_c = A\text{-}MPR_{NR}$$

with $A\text{-}MPR_{LTE}$ and $A\text{-}MPR_{NR}$ as defined in this sub-clause.

For DC_(n)71AA with configured with network signaling values as per Table 6.2B.3.1.1-1 the allowed A-MPR is defined by
for UE indicating support of dynamicPowerSharing in the UE-MRDC-Capability IE $$A\text{-}MPR_{DC} = CEIL\{M_{A,DC}(A), 0.5\}$$

where $A\text{-}MPR_{DC}$ is the total power reduction allowed (dB),
for OFDM:
  $M_{A,DC} = 11.00 - 11.67*A$; $0.00 < A \le 0.30$  $8.10 - 2.00*A$; $0.30 < A \le 0.80$  $6.50$; $0.80 < A \le 1.00$
for DFT-S-OFDM:
  $M_{A,DC} = 11.00 - 13.33*A$; $0.00 < A \le 0.30$  $8.00 - 3.33*A$; $0.30 < A \le 0.60$  $6.00$; $0.60 < A \le 1.00$
where $$A = \frac{L_{CRB,LTE} + L_{CRB,NR}}{N_{RB,LTE} + N_{RB,NR}}$$

with $L_{CRB,LTE}$ and $N_{RB,LTE}$ the number of allocated PRB and transmission bandwidth for MCG, $L_{CRB,NR}$ and $N_{RB,NR}$ the number of allocated PRB and transmission bandwidth for SCG with SCS=15 kHz.

for UE not indicating support of dynamicPowerSharing $$A\text{-}MPR_{LTE} = CEIL\{M_{A,LTE}, 0.5\}$$

$$A\text{-}MPR_{NR} = CEIL\{M_{A,NR}, 0.5\}$$

where A-MPR is the total power reduction allowed per CG with $$M_{A,LTE} = M_{A,DC}(A_{LTE,wc}) - 1 - \Delta_{LTE}$$

$$M_{A,NR} = M_{A,DC}(A_{NR,wc}) - 1 - \Delta_{NR}$$

$$A_{LTE,wc} = \frac{L_{CRB,LTE} + 1}{N_{RB,LTE} + N_{RB,NR}}$$

$$A_{NR,wc} = \frac{1 + L_{CRB,NR}}{N_{RB,LTE} + N_{RB,NR}}$$

$$\Delta_{LTE} = 10\log_{10}\frac{N_{RB,LTE}}{N_{RB,LTE} + N_{RB,NR}}$$

$$\Delta_{NR} = 10\log_{10}\frac{N_{RB,NR}}{N_{RB,LTE} + N_{RB,NR}}$$

Where $L_{CRB,NR}$ and $N_{RB,NR}$ the number of allocated PRB and transmission bandwidth for SCG with SCS=15 kHz.

6.2B.3.1.2 A-MPR for NS_04
6.2B.3.1.2.0 General

When the UE is configured for B41/n41 intra-band contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signaled.

For UE supporting dynamic power sharing the following:
for the MCG, A-MPR$_c$ in accordance with 3GPP TS 36.101
for the SCG, A-MPR$_{NR}$=MAX(A-MPR$_{single,NR}$,A-MPR$_{IM3}$)

if $10*\log_{10}(\hat{P}_{MCG}) < P_{PowerClass,EN-DC} - $A-MPR$_{tot}$, then

A-MPR'$_c$=MIN($P_{EMAX,c}, P_{EMAX,EN-DC}, P_{NR}$)−10*log$_{10}$ (10^(($P_{PowerClass,EN-DC}$−A-MPR$_{tot}$)/10)−$\hat{P}_{MCG}$)

else

A-MPR'$_c$=infinity, where $\hat{P}_{MCG}$ is the configured output power for the MCG in linear terms
for the total configured transmission power, A-MPR$_{tot}$=$P_{PowerClass,EN-DC}$−min($P_{PowerClass,EN-DC}$, 10*log$_{10}$(10^(($P_{PowerClass,E-UTRA}$−A-MPR$_{E-UTRA}$)/10)+10^(($P_{PowerClass,NR}$−A-MPR$_{NR}$)/10))

where

A-MPR$_{E-UTRA}$=MAX(A-MPR$_{single,E-UTRA}$+MPR$_{single,E-UTRA}$,A-MPR$_{IM3}$)

with
A-MPR$_{single,E-UTRA}$ is the A-MPR defined for the E-UTRA transmission in 3GPP TS 36.101
A-MPR$_{single,NR}$ is the A-MPR defined for the NR transmission in accordance with 3GPP TS 38.101-1
MPR$_{single,E-UTRA}$ is the MPR defined for the E-UTRA transmission in 3GPP TS 36.101

For UEs not supporting dynamic power sharing the following
for the MCG,

A-MPR$_c$=MAX(A-MPR$_{single,E-UTRA}$+MPR$_{single,E-UTRA}$, -MPR$_{IM3}$)

for the SCG,

A-MPR'$_c$=MAX(A-MPR$_{single,NR}$,A-MPR$_{IM3}$)

where
A-MPR$_{single,E-UTRA}$ is the A-MPR defined for the E-UTRA transmission in 3GPP TS 36.101
A-MPR$_{single,NR}$ is the A-MPR defined for the NR transmission in accordance with 3GPP TS 38.101-1
MPR$_{single,E-UTRA}$ is the MPR defined for the E-UTRA transmission in 3GPP TS 36.101

The UE determines the Channel Configuration Case and the value of A-MPR$_{IM3}$ as follows:

If $F_{IM3,low\_block,low}$<2490.5 MHz
Channel Configuration Case B. A-MPR$_{IM3}$ defined in Subclause 6.2B.3.1.2.2
Else
Channel Configuration Case A. A-MPR$_{IM3}$ defined in Subclause 6.2B.3.1.2.1
where
$F_{IM3,low\_block,low}$=(2*$F_{low\_channel,low\_edge}$)−$F_{high\_channel,high\_edge}$
$F_{low\_channel,low\_edge}$ is the lowermost frequency of lower transmission bandwidth configuration.
$F_{high\_channel,high\_edge}$ is the uppermost frequency of upper transmission bandwidth configuration.

6.2B.3.1.2.1 A-MPR$_{IM3}$ for NS_04 to Meet −13 dBm/1 MHz for 26 dBm UE Power

A-MPR in this sub-clause is relative to 26 dBm for a power class 2 Cell Group. The same A-MPR is used relative to 23 dBm for a power class 3 Cell Group. For the UE is configured with channel configurations Case A or Case C (defined in Subclause 6.2B.3.2.1), the allowed maximum output power reduction for IM3s applied to transmission on the MCG and the SCG with non-contiguous resource allocation is defined as follows:

A-MPR$_{IM3}$=$M_A$

Where $M_A$ is defined as follows
$M_A$=15; 0≤B<0.5
10; 0.5≤B<1.0
8; 1.0≤B<2.0
6; 2.0≤B
Where:
For UEs supporting dynamic power sharing, B=($L_{CRB\_alloc,E-UTRA}$*12*SCS$_{E-UTRA}$+$L_{CRB\_alloc,NR}$*12*SCS$_{NR}$)/1,000,000

For UEs not supporting dynamic power sharing,
For E-UTRA

B=($L_{CRB\_alloc,E-UTRA}$*12*SCS$_{E-UTRA}$+12*SCS$_{NR}$)/1,000,000

Where SCS$_{NR}$=15 kHz is assumed in calculation of B
For NR

B=(12*SCS$_{E-UTRA}$+$L_{CRB\_alloc,NR}$*12*SCS$_{NR}$)/1,000,000

Where $SCS_{E-UTRA}=15$ kHz is assumed in calculation of B. and $M_A$ is reduced by 1 dB for B<2.0.

6.2B.3.1.2.2 A-MPR for NS_04 to Meet −25 dBm/1 MHz for 26 dBm UE Power

Example 4

6.2B.3.2.1 A-MPR for NS_04

When the UE is configured for B41/n41 intra-band non-contiguous EN-DC and it receives IE NS_04, the UE determines the total allowed maximum output power reduction as specified in this subclause. The A-MPR for EN-DC defined in this section is used instead of MPR defined in 6.2B.2.2, not additively, so EN-DC MPR=0 when NS_04 is signaled.

For UE supporting dynamic power sharing the following:
for the MCG, A-MPR$_c$ in accordance with 3GPP TS 36.101
for the SCG, $$A\text{-}MPR_{NR}=MAX(A\text{-}MPR_{single,NR}, -MPR_{EN\text{-}DC}) \text{ if } 10*\log_{10}(\hat{P}_{MCG})<P_{PowerClass,EN\text{-}DC}-A\text{-}MPR_{tot},$$

then $$A\text{-}MPR'_c=MIN(P_{EMAX,c}, P_{EMAX,EN\text{-}DC}, P_{NR})-10*\log_{10}(10^{((P_{PowerClass,EN\text{-}DC}-A\text{-}MPR_{tot})/10)}-\hat{P}_{MCG})$$

else $$A\text{-}MPR'_c=\text{infinity},$$

where $\hat{P}_{MCG}$ is the configured output power for the MCG in linear terms
for the total configured transmission power, $$A\text{-}MPR_{tot}=P_{PowerClass,EN\text{-}DC}-\min(P_{PowerClass,EN\text{-}DC}, 10*\log_{10}(10^{((P_{PowerClass,E\text{-}UTRA}-A\text{-}MPR_{E\text{-}UTRA})/10)}+10^{((P_{PowerClass,NR}-A\text{-}MPR_{NR})/10)}))$$

where $$A\text{-}MPR_{E\text{-}UTRA}=MAX(A\text{-}MPR_{single,E\text{-}UTRA}+MPR_{single,E\text{-}UTRA}, A\text{-}MPR_{EN\text{-}DC}) A\text{-}MPR_{EN\text{-}DC}=MAX(A\text{-}MPR_{IM3}, A\text{-}MPR_{ACLRoverlap})$$

with
A-MPR$_{single,E-UTRA}$ is the A-MPR defined for the E-UTRA transmission in 3GPP TS 36.101
A-MPR$_{single,NR}$ is the A-MPR defined for the NR transmission in accordance with 3GPP TS 38.101-1
MPR$_{single,E-UTRA}$ is the MPR defined for the E-UTRA transmission in 3GPP TS 36.101
For UEs not supporting dynamic power sharing the following
for the MCG, $$A\text{-}MPR_c=MAX(A\text{-}MPR_{single,E\text{-}UTRA}+MPR_{single,E\text{-}UTRA}, A\text{-}MPR_{IM3}, A\text{-}MPR_{ACLRoverlap})$$

for the SCG, $$A\text{-}MPR'_c=MAX(A\text{-}MPR_{single,NR}, A\text{-}MPR_{IM3}, A\text{-}MPR_{ACLRoverlap})$$

where
A-MPR$_{single,E-UTRA}$ is the A-MPR defined for the E-UTRA transmission in 3GPP TS 36.101
A-MPR$_{single,NR}$ is the A-MPR defined for the NR transmission in accordance with 3GPP TS 38.101-1
MPR$_{single,E-UTRA}$ is the MPR defined for the E-UTRA transmission in 3GPP TS 36.101

The UE determines the Channel Configuration Case and the value of A-MPR$_{IM3}$ as follows:

If AND($F_{IM3,low\_block,high}<F_{filter,low}$, MAX(SEM$_{-13,high}$, $F_{IM3,high\_block,low}$)>$F_{filter,high}$)

Channel Configuration Case C. A-MPR$_{IM3}$ defined in Subclause 6.2B.3.1.2.1
Else
Channel Configuration Case D. A-MPR$_{IM3}$ defined in Subclause 6.2B.3.1.2.2
where $$F_{IM3,low\_block,high}=(2*F_{low\_channel,high\_edge})-F_{high\_channel,low\_edge}$$
$$F_{IM3,high\_block,low}=(2*F_{high\_channel,low\_edge})-F_{low\_channel,high\_edge}$$

$F_{low\_channel,low\_edge}$ is the lowermost frequency of lower transmission bandwidth configuration.
$F_{low\_channel,high\_edge}$ is the uppermost frequency of lower transmission bandwidth configuration.
$F_{high\_channel,low\_edge}$ is the lowermost frequency of upper transmission bandwidth configuration.
$F_{high\_channel,high\_edge}$ is the uppermost frequency of upper transmission bandwidth configuration.
$F_{filter,low}=2480$ MHz
$F_{filter,high}=2745$ MHz
SEM$_{-13,high}$=Threshold frequency where upper spectral emission mask for upper channel drops from −13 dBm/1 MHz to −25 dBm/1 MHz, as specified in Subclause 6.5B.2.1.2.2.

The UE determines the value of A-MPR$_{ACLRoverlap}$ as specified in Table 6.2B.3.2.1-1:

TABLE 6.2B.3.2.1-1

| | A-MPR$_{ACLRoverlap}$ |
|---|---|
| $W_{gap}$ | A-MPR$_{ACLRoverlap}$ |
| <BW$_{channel, E-UTRA}$ + BW$_{channel, NR}$ | 4 dB |
| ≥BW$_{channel, E-UTRA}$ + BW$_{channel, NR}$ | 0 dB |

NOTE 1:
$W_{gap} = F_{high\_channel, low\_edge} - F_{low\_channel, high\_edge}$ 6.2B.3.3 Inter-Band EN-DC within FR1

Example 5

6.2B.4 Configured Output Power for EN-DC
6.2B.4.1 Configured Output Power Level
6.2B.4.1.1 Intra-Band Contiguous EN-DC
The following requirements apply for one component carrier per CG configured for synchronous DC.
For intra-band dual connectivity with one uplink serving cell per CG on E-UTRA and NR respectively, the UE is allowed to set its configured maximum output power $P_{CMAX,c(i),i}$ for serving cell c(i) of CG i, i=1, 2, and its total configured maximum transmission power for EN-DC operation $P_{Total}^{EN-DC}=10 \log 10(\hat{P}_{total}^{EN-DC})$ with $\hat{P}_{total}^{EN-DC}$ as specified in sub-clause 7.6 of 3GPP TS 38.213: "NR; Physical layer procedures for control".

The configured maximum output power $P_{CMAX\_E-UTRA,c}(p)$ in sub-frame p for the configured E-UTRA uplink carrier shall be set within the bounds:

$$P_{CMAX\_L\_E-UTRA,c}(p) \leq P_{CMAX\_E-UTRA,c}(p) \leq P_{CMAX\_H\_E-UTRA,c}(p)$$

where $P_{CMAX\_L\_E-ETRA,c}$ and $P_{CMAX\_H\_E-UTRA,c}$ are the limits for a serving cell c as specified in TS 36.101 sub-clause 6.2.5 modified by $P_{LTE}$ as follows:

$$P_{CMAX\_L\_E\text{-}UTRA,c} = \text{MIN}\{\text{MIN}(P_{EMAX,c}, P_{EMAX,EN\text{-}DC}, P_{LTE}) - \Delta t_{C\_E\text{-}UTRA,c}, (P_{PowerClass} - \Delta P_{PowerClass}) - \text{MAX}(MPR_c + A\text{-}MPR_c + \Delta T_{IB,c} + \Delta T_{C\_E\text{-}UTRA,c} + \Delta T_{ProSe}, P\text{-}MPR_c)\}$$

$$P_{CMAX\_H\_E\text{-}UTRA,c} = \text{MIN}\{P_{EMAX,c}, P_{EMAX,EN\text{-}DC}, P_{LTE}, P_{PowerClass} - \Delta P_{PowerClass}\}$$

where $P_{EMAX,EN\text{-}DC}$ is the value given by the field p-maxUE-FR1 of the RRCConnectionReconfiguration-v1530 IE as defined in 3GPP TS 36.331; "Evolved Universal Terrestrial Radio Access (E-UTRA); Radio Resource Control (RRC); Protocol specification";

$P_{LTE}$ is the value given by the field p-maxEUTRA-FR1 of the RRCConnectionReconfiguration-v1510 as defined in TS 36.331;

$\Delta t_{C\_EUTRA,c} = 1.5$ dB when NOTE 2 in Table 6.2.2-1 of 3GPP TS 36.101 applies; $\Delta t_{C\_EUTRA,c} = 0$ dB otherwise;

and whenever NS_01 is not indicated within CG 1:

for a UE indicating support of dynamicPowerSharing, the A-MPR$_c$ is determined in accordance with the DCI of serving cell c of the CG 1 and the specification in sub-clause 6.2.4 of 3GPP TS 36.101;

for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

and whenever NS_01 is indicated in CG 1:

for a UE indicating support of dynamicPowerSharing, the MPR$_c$ is determined in accordance with the DCI of serving cell c of the CG 1 and the specification in sub-clause 6.2.4 of 3GPP TS 36.101;

for a UE not indicating support of dynamicPowerSharing, the MPR$_c$ is determined in accordance with sub-clause 6.2B.2.1 with parameters applicable for UEs not indicating support of dynamicPowerSharing and A-MPR$_c$=0 dB;

The configured maximum output power $P_{CMAX\_NR,c}(q)$ in physical channel q for the configured NR carrier shall be set within the bounds:

$$P_{CMAX\_L,f,c,NR}(q) \leq P_{CMAX,f,c,NR}(q) \leq P_{CMAX\_H,f,c,NR}(q)$$

where $P_{CMAX\_L\_NR,c}$ and $P_{CMAX\_H\_NR,c}$ are the limits for a serving cell c as specified in sub-clause 6.2.4 of TS 38.101-1 modified as follows:

$$P_{CMAX\_L,f,c,NR} = \text{MIN}\{\text{MIN}(P_{EMAX,c}, P_{EMAX,EN\text{-}DC}, P_{NR}) - \Delta T_{C\_NR,c}, (P_{PowerClass} - \Delta P_{PowerClass}) - \text{MAX}(MPR_c + A\text{-}MPR_c + \Delta T_{IB,c} + \Delta T_{C\_NR,c} + \Delta T_{RxSRS}, P\text{-}MPR_c)\}$$

if $\hat{P}_{MCG} < 10^{\wedge}(\text{MIN}\{P_{EMAX,EN\text{-}DC}, P_{PowerClass} - \Delta P_{PowerClass}\}/10)$ $P_{CMAX\_H,f,c,NR} = \text{MIN}\{10*\log 10(10^{\wedge}(\text{MIN}\{P_{EMAX,EN\text{-}DC}, P_{PowerClass} - \Delta P_{PowerClass}\}/10 - \hat{P}_{MCG}), P_{EMAX,c}, P_{NR}\}$ else $$P_{CMAX\_H,f,c,NR} = -\text{infinity}$$

where $\hat{P}_{MCG}$ is the configured output power for the MCG in linear terms
where $P_{EMAX,EN\text{-}DC}$ is the value given by the field p-maxUE-FR1 of the RRCConnectionReconfiguration-v1530 IE as defined in TS 36.331;

$P_{LTE}$ signalled by RRC as p-MaxEUTRA in TS 36.331
$P_{NR}$ is the value given by the field p-NR-FR1 of the PhysicalCellGroupConfig IE as defined in 3GPP TS 38.331: "NR; Radio Resource Control (RRC) protocol specification" and signalled by RRC;

$\Delta T_{c\_E\text{-}UTRA,c} = 1.5$ dB when NOTE 2 in Table 6.2.2-1 in TS 36.101 applies for a serving cell c, otherwise $\Delta T_{C\_E\text{-}UTRA,c} = 0$ dB;

$\Delta T_{C\_NR,c} = 1.5$ dB when NOTE 3 in Table 6.2.1-1 in TS 38.101-1 applies for a serving cell c, otherwise $\Delta T_{C\_NR,c} = 0$ dB;

$\Delta T_{IB,c}$ specified in sub-clause 6.2.7 for EN-DC, the individual Power Class defined in table 6.2B.1-3 and any other additional power reductions parameters specified in sub-clauses 6.2.3 and 6.2.4 for EN-DC are applicable to $P_{CMAX\_E\text{-}UTRA,c}$ and $P_{CMAX\_NR,c}$ evaluations.

and whenever NS_01 is not indicated within CG 2:

for a UE indicating support of dynamicPowerSharing, A-MPR$_c$=A-MPR'$_c$ with A-MPR'$_c$ determined in accordance with sub-clause 6.2B.3.1 and MPR$_c$=0 dB if transmission(s) in subframe p on CG 1 overlap in time with physical channel q on CG 2;

for a UE indicating support of dynamicPowerSharing, A-MPR$_c$ is determined in accordance with TS 38.101-1 if transmission(s) in subframe p on CG 1 does not overlap in time with physical channel q on CG 2;

for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

and whenever NS_01 is indicated in CG 2.

for a UE indicating support of dynamicPowerSharing, MPRc=MPR'c with MPR'c determined in accordance with sub-clause 6.2B.2.1 and A-MPRc=0 dB if transmission(s) in subframe p on CG 1 overlap in time with physical channel q on CG 2;

for a UE indicating support of dynamicPowerSharing, MPRc is determined in accordance with TS 38.101-1 if transmission(s) in subframe p on CG 1 does not overlap in time with physical channel q on CG 2;

for a UE not indicating support of dynamicPowerSharing, the MPRc is determined in accordance with sub-clause 6.2B.2.1 with parameters applicable for UEs not indicating support of dynamicPowerSharing and MPRc=0 dB;

If the transmissions from NR and E-UTRA do not overlap, then the complete sub-clauses for configured transmitted power for E-UTRA and NR respectively from their own specifications apply with the modifications specified above. The lower value between $P_{PowerClass,EN\text{-}DC}$ or $P_{EMAX,EN\text{-}DC}$ shall not be exceeded at any time by UE.

If the EN-DC UE is not supporting dynamic power sharing, then the complete sub-clauses for configured transmitted power for E-UTRA and NR respectively from their own specifications TS 36.101 and TS 38.101-1 respectively apply with the modifications specified above.

If the UE does not support dynamic power sharing, $$P_{Total}^{EN\text{-}DC} = \text{MIN}\{P_{EMAX,EN\text{-}DC}, P_{PowerClass,EN\text{-}DC}\} + 0.3 \text{ dB}$$

For UEs indicating support of dynamicPowerSharing in the UE-MRDC-Capability IE the UE can configure the total maximum transmission power $P_{Total}^{EN\text{-}DC}$ within the range $$P_{EN\text{-}DC,tot\_L} \leq P_{Total}^{EN\text{-}DC} \leq P_{EN\text{-}DC,tot\_H}$$

where $$P_{EN\text{-}DC,tot\_L}(p,q) = \text{MIN}\{P_{PowerClass,EN\text{-}DC}, P_{EMAX,EN\text{-}DC}\}$$

$$P_{EN\text{-}DC,tot\_H}(p,q) = \text{MIN}\{P_{PowerClass,EN\text{-}DC}, P_{EMAX,EN\text{-}DC}\}$$

for sub-frame p on CG 1 overlapping with physical channel q on CG 2 and with MPR$_{tot}$ and A-MPR$_{tot}$ in accordance with 6.2B.2.1 and sub-clause 6.2B.3.1, respectively.

The measured total maximum output power $P_{UMAX}$ over both CGs/RATs, measured over the transmission reference time duration is $$P_{UMAX} = 10 \log_{10}[p_{UMAX,c,E\text{-}UTRA} + p_{UMAX,f,c,NR}],$$

where $p_{UMAX,c,E\text{-}UTRA}$ and $p_{UMAX,c,NR}$ denotes the measured output power of serving cell c for E-UTRA and NR respectively, expressed in linear scale.

For UEs indicating support of dynamicPowerSharing, the measured total configured maximum output power $P_{UMAX}$ shall be within the following bounds:

$$P_{CMAX\_L} - T_{LOW}(P_{CMAX\_L}) \leq P_{UMAX} \leq P_{UMAX} \leq P_{CMAX\_H} + T_{HIGH}(P_{CMAX\_H})$$

with the tolerances $T_{LOW}(P_{CMAX\_L})$ and $T_{HIGH}(P_{CMAX\_H})$ for applicable values of $P_{CMAX\_L}$ and $P_{CMAX\_L}$ specified in Table 6.2B.4.1.1-2.

When an UL subframe transmission p from E-UTRA overlap with a physical channel q from the NR, then for $P_{UMAX}$ evaluation, the E-UTRA subframe p is taken as reference period $T_{REF}$ and always considered as the reference measurement duration and the following rules are applicable. $T_{REF}$ and $T_{eval}$ are specified in Table 6.2B.4.1.1-1 when same or different subframes and physical channel durations are used in aggregated carriers. $P_{PowerClass,EN\text{-}DC}$ shall not be exceeded by the UE during any evaluation period of time.

TABLE 6.2B.4.1.1-1

P$_{CMAX}$ evaluation window

| transmission duration | T$_{REF}$ | T$_{eval}$ |
|---|---|---|
| Different transmission duration in different RAT carriers | LTE Subframe | Min(T$_{no\_hopping}$, Physical Channel Length) |

For each $T_{REF}$, the $P_{CMAX\_H}$ is evaluated per $T_{eval}$ and given by the maximum value over the transmission(s) within the $T_{eval}$ as follows:

$$P_{CMAX\_H} = \text{MAX}\{P_{CMAX\_EN\text{-}DC\_H}(p,q), P_{CMAX\_EN\text{-}DC\_H}(p,q+1), \ldots, P_{CMAX\_EN\text{-}DC\_H}(p,q+n)\}$$

where $P_{CMAX\_EN\text{-}DC\_H}$ are the applicable upper limits for each overlapping scheduling unit pairs (p,q), (p, q+1), up to (p, q+n) for each applicable $T_{eval}$ duration, where q+n is the last NR UL physical channel overlapping with LTE subframe p.

While $P_{CMAX\_L}$ is computed as follows:

$$P_{CMAX\_L} = \text{MIN}\{P_{CMAX\_EN\text{-}DC\_L}(p,q), P_{CMAX\_EN\text{-}DC\_L}(p,q+1), \ldots, P_{CMAX\_EN\text{-}DC\_L}(p,q+n)\}$$

where $P_{CMAX\_EN\text{-}DC\_L}$ are the applicable lower limits for each overlapping scheduling unit pairs (p,q), (p, q+1), up to (p, q+n) for each applicable $T_{eval}$ duration, where q+n is the last NR UL physical channel overlapping with LTE subframe p, With $$P_{CMAX\_EN\text{-}DC\_H}(p,q) = \text{MIN}\{10 \log_{10}[p_{CMAX\_H,E\text{-}UTRA,c}(p) + p_{CMAX\_H,f,c,NR\_c}(q)], P_{EMAX,EN\text{-}DC}, P_{PowerClass,EN\text{-}DC}\}$$

If a=FALSE and the configured transmission power spectral density between the MCG and SCG differs by less than [6] dB If the configured transmission power spectral density between the MCG and SCG differs by less than or equal to [6] dB $$P_{CMAX\_EN\text{-}DC\_L}(p,q) = \text{MIN}\{10 \log_{10}[p_{CMAX\_L,E\text{-}UTRA,c}(p) + p_{CMAX\_L,f,c,NR\_c}(q)], P_{EMAX,EN\text{-}DC}, P_{PowerClass,EN\text{-}DC}\}$$

ELSE $$P_{CMAX\_EN\text{-}DC\_L}(p,q) = \text{MIN}\{10 \log_{10}[p_{CMAX\_L\_E\text{-}UTRA,c}(p)], P_{EMAX,EN\text{-}DC}, P_{PowerClass,EN\text{-}DC}\}$$

where $p_{CMAX\_H\_E\text{-}UTRA,c}(p)$ is the E-UTRA higher limit of the maximum configured power expressed in linear scale;

$p_{CMAX\_H\_NR,c}(q)$ is the NR higher limit of the maximum configured power expressed in linear scale;

$p_{CMAX\_L\_E\text{-}UTRA,c}(p)$ is the E-UTRA lower limit of the maximum configured power expressed in linear scale;

$p_{CMAX\_L\_NR,c}(q)$ is the NR lower limit of the maximum configured power expressed in linear scale;

$P_{PowerClass,\ EN\text{-}DC}$ is defined in sub-clause 6.2B.1.1-1 for intra-band EN-DC;

X_scale is the linear value of X dB which is configured by RRC and can only take values [0, 6] dB $p_{CMAX\_E\text{-}UTRA,c}(p)$ is the linear value of $P_{CMAX\_E\text{-}UTRA,c}(p)$, the real configured max power for LTE $p_{CMAX,f,c\ NR}(q)$ is the linear value of $P_{CMAX,f,c\ NR}(q)$, the real configured max power of NR

TABLE 6.2B.4.1.1-2

P$_{CMAX}$ tolerance for Dual Connectivity LTE-NR

| P$_{CMAX}$(dBm) | Tolerance T$_{LOW}$ (P$_{CMAX\_L}$) (dB) | Tolerance T$_{HIGH}$ (P$_{CMAX\_H}$) (dB) |
|---|---|---|
| 23 ≤ P$_{CMAX}$ ≤ 33 | [3.0] | [2.0] |
| 22 ≤ P$_{CMAX}$ < 23 | [5.0] | [2.0] |
| 21 ≤ P$_{CMAX}$ < 22 | [5.0] | [3.0] |
| 20 ≤ P$_{CMAX}$ < 21 | [6.0] | [4.0] |
| 16 ≤ P$_{CMAX}$ < 20 | | [5.0] |
| 11 ≤ P$_{CMAX}$ < 16 | | [6.0] |
| −40 ≤ P$_{CMAX}$ < 11 | | [7.0] |

If the UE supports dynamic power sharing, the measured maximum output power in subframe p on CG 1, $p_{UMAX,c,E\text{-}UTRA}$, shall meet the requirements in subclause 6.2.5 in 3GPP TS 36.101 with the limits $P_{CMAX\_L,c}$ and $P_{CMAX\_H,c}$ replaced by $P_{CMAX\_L\_E\text{-}UTRA,c}$ and $P_{CMAX\_H\_E\text{-}UTRA,c}$ as specified above, respectively.

If the configured transmission power spectral density between the MCG and SCG differs by more than [6] dB, then $$P_{UMAX,f,c,NR}(q) \leq 10 \log(p_{CMAX\_H,f,c,NR}(q)) + T_{HIGH}(10 \log(p_{CMAX\_H,f,c,NR}(q))).$$

6.2B.4.1.2 Intra-Band Non-Contiguous EN-DC

Example 6

6.2B.4.1.3 Inter-Band EN-DC within FR1

For inter-band dual connectivity with one uplink serving cell per CG on E-UTRA and NR respectively, the UE is allowed to set its configured maximum output power $P_{CMAX,c(i),i}$ for serving cell c(i) of CG i, i=1, 2, and its total configured maximum transmission power for EN-DC operation, $P_{Total}^{EN-DC}=10 \log 10(\hat{P}_{total}^{EN-DC})$ with $\hat{P}_{total}^{EN-DC}$ as specified in sub-clause 7.6 of TS 38.213.

The configured maximum output power $P_{CMAX\_E-UTRA,c}(p)$ in sub-frame p for the configured E-UTRA uplink carrier shall be set within the bounds:

$$P_{CMAX\_L\_E-UTRA,c}(p) \leq P_{CMAX\_E-UTRA,c}(p) \leq P_{CMAX\_H\_E-UTRA,c}(p)$$

where $P_{CMAX\_L\_E-UTRA,c}$ and $P_{CMAX\_H\_E-UTRA,c}$ are the limits for a serving cell c as specified in TS 36.101 sub-clause 6.2.5 modified by $P_{LTE}$ as follows:

$$P_{CMAX\_L\_E-UTRA,c} = \text{MIN}\{P_{EMAX,EN-DC},$$
$$(P_{PowerClass,EN-DC} - \Delta P_{PowerClass,EN-DC}), \text{MIN}$$
$$(P_{EMAX,c}, P_{LTE}) - \Delta T_{C\_E-UTRA,c}, (P_{PowerClass} -$$
$$\Delta P_{PowerClass}) - \text{MAX}(MPR_c + A\text{-}MPR_c + \Delta T_{IB,c} +$$
$$\Delta T_{C\_E-UTRA,c} + \Delta T_{ProSe}, P\text{-}MPR_c)\}$$
$$P_{CMAX\_H\_E-UTRA,c} = \text{MIN}\{P_{EMAX,c}, P_{EMAX,EN-DC},$$
$$(P_{PowerClass,EN-DC} - \Delta P_{PowerClass,EN-DC}), P_{LTE},$$
$$P_{PowerClass} - \Delta P_{PowerClass}\}$$

The configured maximum output power $P_{CMAX\_NR,c}(q)$ in physical-channel q for the configured NR carrier shall be set within the bounds:

$$P_{CMAX\_L,f,c,NR}(q) \leq P_{CMAX,f,c,NR}(q) \leq P_{CMAX\_H,f,c,NR}(q)$$

where $P_{CMAX\_L\_NR,c}$ and $P_{CMAX\_H\_NR,c}$ are the limits for a serving cell c as specified in sub-clause 6.2.4 of TS 38.101-1 modified as follows:

$$P_{CMAX\_L,f,c,NR} = \text{MIN}\{P_{EMAX,EN-DC},$$
$$(P_{PowerClass,EN-DC} - \Delta P_{PowerClass,EN-DC}), \text{MIN}$$
$$(P_{EMAX,c}, P_{NR}) - \Delta T_{C\_NR,c}, (P_{PowerClass} -$$
$$\Delta P_{PowerClass}) - \text{MAX}(MPR_c + A\text{-}MPR_c + \Delta T_{IB,c} +$$
$$\Delta T_{C\_NR,c} + \Delta T_{RxSRS}, P\text{-}MPR_c)\}$$

if $\hat{P}_{MCG} < 10^{\wedge}(\text{MIN}\{P_{EMAX,EN-DC}, P_{PowerClass,EN-DC} -$
$\Delta P_{PowerClass,EN-DC}\}/10)$
$P_{CMAX\_H,f,c,NR} = \text{MIN}\{10*\log 10(10^{\wedge}$
$(\text{MIN}\{P_{EMAX,EN-DC}, (P_{PowerClass,EN-DC} -$
$\Delta P_{PowerClass,EN-DC})\}/10) - \hat{P}_{MCG}), P_{EMAX,c}, P_{NR},$
$P_{PowerClass} - \Delta P_{PowerClass}\}$ else $$P_{CMAX\_H,f,c,NR} = -\text{infinity}$$

where $\hat{P}_{MCG}$ is the configured output power for the MCG in linear terms
where
- $P_{EMAX,EN-DC}$ is the value given by the field p-maxUE-FR1 of the RRCConnectionReconfiguration-v1530 IE as defined in TS 36.331;
- $P_{LTE}$ is the value given by the field p-maxEUTRA-FR1 of the RRCConnectionReconfiguration-v1510 IE as defined in TS 36.331;
- $P_{NR}$ is the value given by the field p-NR-FR1 of the PhysicalCellGroupConfig IE as defined in TS 38.331;
- $\Delta T_{c\_E-UTRA,c}=1.5$ dB when NOTE 2 in Table 6.2.2-1 in TS 36.101 applies for a serving cell c, otherwise $\Delta T_{C\_E-UTRA,c}=0$ dB;
- $\Delta T_{C\_NR,c}=1.5$ dB when NOTE 3 in Table 6.2.1-1 in TS 38.101-1 applies for a serving cell c, otherwise $\Delta T_{C\_NR,c}=0$ dB;
- $\Delta T_{IB,c}$ specified in sub-clause 6.2.7 for EN-DC, the individual Power Class defined in table 6.2B.1-3 and any other additional power reductions parameters specified in sub-clauses 6.2.3 and 6.2.4 for EN-DC are applicable to $P_{CMAX\_E-UTRA,c}$ and $P_{CMAX\_NR,c}$ evaluations.
- $\Delta P_{PowerClass,EN-DC}=3$ dB for a power class 2 capable EN-DC UE when LTE UL/DL configuration is 0 or 6; or LTE UL/DL configuration is 1 and special subframe configuration is 0 or 5; or the IE p-maxUE-FR1 as defined in 3GPP TS 38.331: "NR; Radio Resource Control (RRC) protocol specification" is provided and set to the maximum output power of the default power class or lower; otherwise $\Delta P_{PowerClass,EN-DC}=0$ dB;

If the transmissions from NR and E-UTRA do not overlap, then the complete sub-clauses for configured transmitted power for E-UTRA and NR respectively from their own specifications apply with the modifications specified above. The lower value between $P_{PowerClass,EN-DC}$ or $P_{EMAX,EN-DC}$ shall not be exceeded at any time by UE. $P_{Total}^{EN-DC}=10 \log 10(\hat{P}_{total}^{EN-DC})$ with $P_{Total}^{EN-DC}$ the configured maximum transmission power for EN-DC operation as specified in sub-clause 7.6 of TS 38.213.

The total configured maximum transmission power for both synchronous and non-synchronous operation is $$P_{Total}^{EN-DC} = \text{MIN}\{P_{EMAX,EN-DC}, P_{PowerClass,EN-DC} - \Delta P_{PowerClass,EN-DC}\}$$

If the UE does not support dynamic power sharing, $$P_{Total}^{EN-DC} = \text{MIN}\{P_{EMAX,EN-DC}, P_{PowerClass,EN-DC} - \Delta P_{PowerClass,EN-DC}\} + 0.3 \text{ dB}$$

If the EN-DC UE does not support dynamic power sharing, then the complete sub-clauses for configured transmitted power for E-UTRA and NR respectively from their own specifications TS 36.101 and TS 38.101-1 respectively apply with the modifications specified above and $P_{Total}^{EN-DC}$ applies.

When a UE supporting dynamic sharing is configured for overlapping E-UTRA uplink and NR uplink transmissions, the UE can set its configured maximum output power $P_{CMAX\_E-UTRA,c}$ and $P_{CMAX\_NR,c}$ for the configured E-UTRA and NR uplink carriers, respectively, and its configured maximum transmission power for EN-DC operation, $\hat{P}_{Total}^{EN-DC}$, as specified above.

The measured total maximum output power $P_{UMAX}$ over both CGs/RATs, measured over the transmission reference time duration is $$P_{UMAX}10 \log_{10}[p_{UMAX,c,E-UTRA} + p_{UMAX,c,NR}],$$

where $p_{UMAX,c,E-UTRA}$ and $p_{UMAX,c,NR}$ denotes the measured output power of serving cell c for E-UTRA and NR respectively, expressed in linear scale.

The measured total configured maximum output power $P_{UMAX}$ shall be within the following bounds:

$$P_{CMAX\_L} - T_{LOW}(P_{CMAX\_L}) \leq P_{UMAX} \leq P_{CMAX\_H} + T_{HIGH}(P_{CMAX\_H})$$

with the tolerances $T_{LOW}(P_{CMAX\_H})$ and $T_{HIGH}(P_{CMAX\_H})$ for applicable values of $P_{CMAX}$ specified in Table 6.2B.4.1.3-2.

When an UL subframe transmission p from E-UTRA overlap with a physical-channel q from the NR, then for $P_{UMAX}$ evaluation, the E-UTRA subframe p is taken as reference period $T_{REF}$ and always considered as the reference measurement duration and the following rules are applicable.

$T_{REF}$ and $T_{eval}$ are specified in Table 6.2B.4.1.3-1 when same or different subframe and physical-channel durations are used in aggregated carriers. $P_{PowerClass,EN-DC}$ shall not be exceeded by the UE during any evaluation period of time.

TABLE 6.2B.4.1.3-1

| $P_{CMAX}$ evaluation window | | |
|---|---|---|
| transmission duration | $T_{REF}$ | $T_{eval}$ |
| Different transmission duration in different RAT carriers | LTE Subframe | Min($T_{no\_hopping}$, Physical Channel Length) |

For each $T_{REF}$, the $P_{CMAX\_H}$ is evaluated per $T_{eval}$ and given by the maximum value over the transmission(s) within the $T_{eval}$ as follows:

$$P_{CMAX\_H} = \text{MAX}\{P_{CMAX\_EN-DC\_H}(p,q), P_{CMAX\_EN-DC\_H}(p,q+1), \ldots, P_{CMAX\_EN-DC\_H}(p,q+n)\}$$

where $P_{CMAX\_EN-DC\_H}$ are the applicable upper limits for each overlapping scheduling unit pairs (p,q), (p, q+1), up to (p, q+n) for each applicable $T_{eval}$ duration, where q+n is the last NR UL physical-channel overlapping with LTE subframe p.

While $P_{CMAX\_L}$ is computed as follows:

$$P_{CMAX\_L} = \text{MIN}\{P_{CMAX\_EN-DC\_L}(p,q), P_{CMAX\_EN-DC\_L}(p,q+1), \ldots, P_{CMAX\_EN-DC\_L}(p,q+n)\}$$

where $P_{CMAX\_EN-DC\_L}$ are the applicable lower limits for each overlapping scheduling unit pairs (p,q), (p, q+1), up to (p, q+n) for each applicable $T_{eval}$ duration, where q+n is the last NR UL physical-channel overlapping with LTE subframe p, With $$P_{CMAX\_EN-DC\_H}(p,q) = \text{MIN}\{10 \log_{10}[p_{CMAX\_H\_E-UTRA,c}(p) + p_{CMAX\_H,f,c,NR\_c}(q)], P_{EMAX,EN-DC}, P_{PowerClass,EN-DC}\}$$
$$P_{CMAX\_EN-DC\_L}(p,q) = \text{MIN}\{10 \log_{10}[p_{CMAX\_L\_E-UTRA,c}(p) + p_{CMAX\_L,f,c,NR\_c}(q)], P_{EMAX,EN-DC}, P_{PowerClass,EN-DC}\}$$

where $p_{CMAX\_H\_E-UTRA,c}(p)$ is the E-UTRA higher limit of the maximum configured power expressed in linear scale;

$p_{CMAX\_H\_NR,c}(q)$ is the NR higher limit of the maximum configured power expressed in linear scale;

$p_{CMAX\_L\_E-UTRA,c}(p)$ is the E-UTRA lower limit of the maximum configured power expressed in linear scale;

$p_{CMAX\_L\_NR,c}(q)$ is the NR lower limit of the maximum configured power expressed in linear scale;

$P_{PowerClass,EN-DC}$ is defined in sub-clause 6.2B.1.3-1 for inter-band EN-DC;

X_scale is the linear value of X dB which is configured by RRC and can only take values [0, 6]

$p_{CMAX\_E-UTRA,c}(p)$ is the linear value of $P_{CMAX\_E-UTRA,c}(p)$, the real configured max power for LTE $p_{CMAX,f,c,NR}(q)$ is the linear value of $P_{CMAX,f,c,NR}(q)$, the real configured max power of NR

TABLE 6.2B.4.1.3-2

| $P_{CMAX}$ tolerance for Dual Connectivity LTE-NR | | |
|---|---|---|
| $P_{CMAX}$ (dBm) | Tolerance $T_{LOW}$ ($P_{CMAX\_L}$) (dB) | Tolerance $T_{HIGH}$ ($P_{CMAX\_H}$) (dB) |
| 23 ≤ $P_{CMAX}$ ≤ 33 | [3.0] | [2.0] |
| 22 ≤ $P_{CMAX}$ < 23 | [5.0] | [2.0] |
| 21 ≤ $P_{CMAX}$ < 22 | [5.0] | [3.0] |
| 20 ≤ $P_{CMAX}$ < 21 | [6.0] | [4.0] |

TABLE 6.2B.4.1.3-2-continued

| $P_{CMAX}$ tolerance for Dual Connectivity LTE-NR | | |
|---|---|---|
| $P_{CMAX}$ (dBm) | Tolerance $T_{LOW}$ ($P_{CMAX\_L}$) (dB) | Tolerance $T_{HIGH}$ ($P_{CMAX\_H}$) (dB) |
| 16 ≤ $P_{CMAX}$ < 20 | | [5.0] |
| 11 ≤ $P_{CMAX}$ < 16 | | [6.0] |
| −40 ≤ $P_{CMAX}$ < 11 | | [7.0] |

NOTE 1:
For UEs not indicating support of dynamic power sharing, the upper tolerance $T_{high}$ shall be reduced by 0.3 dB for P ≥ 20 dBm.

6.2B.4.1.4 Inter-Band EN-DC Including FR2

Figure 5:
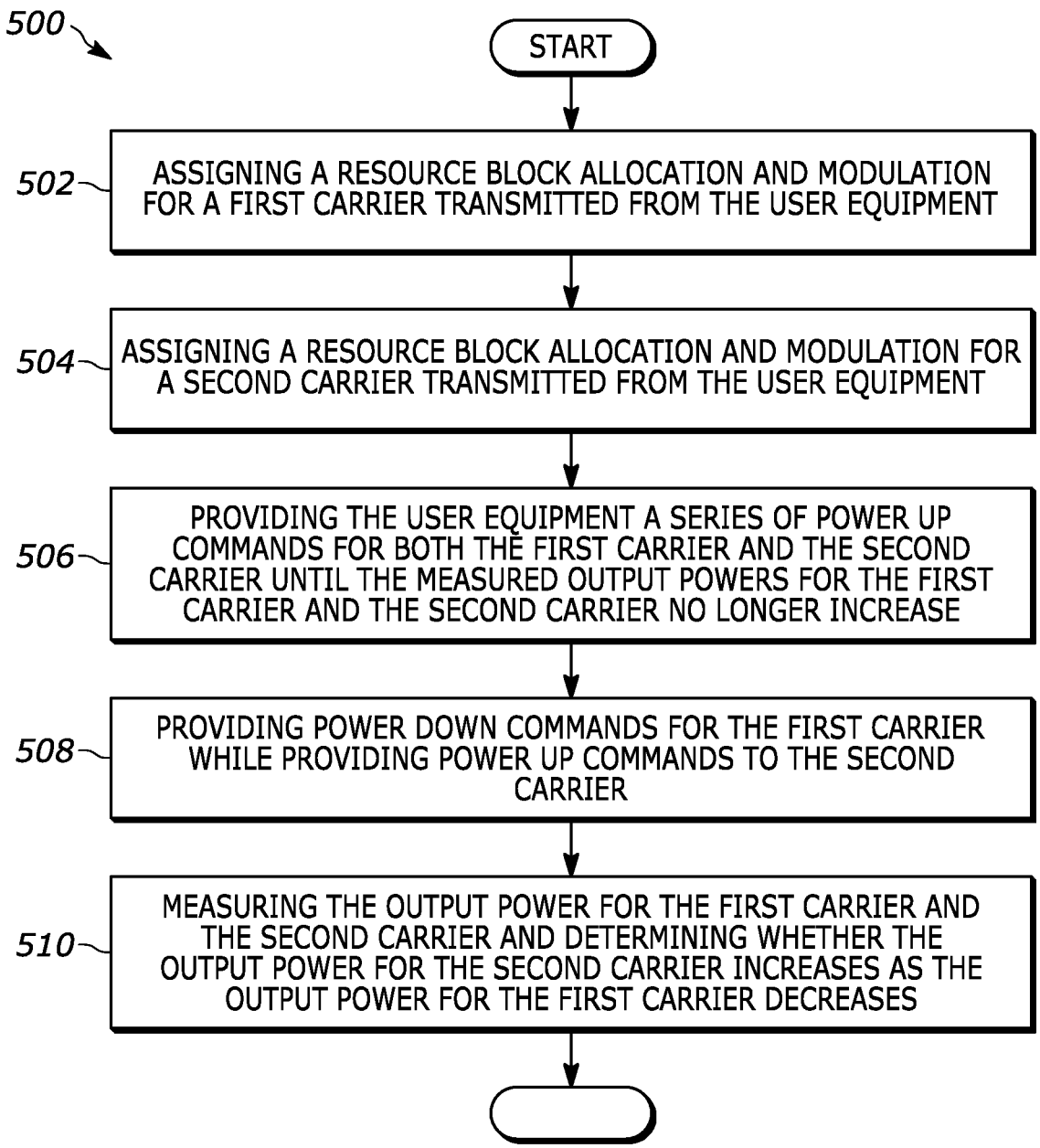
FIG. 5 is a flow diagram verifying use of dynamic power sharing in a user equipment between a first carrier transmission and a second carrier transmission.

FIG. 5 illustrates a flow diagram 500 verifying use of dynamic power sharing in a user equipment between a first carrier transmission and a second carrier transmission. The method includes assigning 502 a resource block allocation and modulation for a first carrier transmitted from the user equipment, and assigning 504 a resource block allocation and modulation for a second carrier transmitted from the user equipment. The user equipment provides 506 a series of power up commands for both the first carrier and the second carrier until the measured output powers for the first carrier and the second carrier no longer increase. Power down commands are then provided 508 for the first carrier while providing power up commands to the second carrier. The output power for the first carrier and the second carrier is then measured 510 and a determination is made as to whether the output power for the second carrier increases as the output power for the first carrier decreases.

In some instances, the first carrier can be associated with a communication with a master cell group. In some instances, the first carrier can be a long term evolution (LTE) carrier.

In some instances, the second carrier can be associated with a communication with a secondary cell group. In some instances, the second carrier can be a new radio (NR) carrier.

In some instances, the power measured on the second carrier can be compared to a threshold which depends on the power measured on the first carrier. In some of these instances, the threshold can correspond to a computed lower limit of the maximum configured power for the second carrier. Further, when the computed lower limit of the maximum configured power for the second carrier is equal to zero, the second carrier transmission can be dropped.

In some instances, a minimum maximum output power for first carrier transmission can be computed based on the allocation and modulation for the first carrier, and wherein after providing the user equipment the series of power up commands for both the first and second carrier until the measured output powers for the first carrier and the second carrier no longer increase, the output power for the first carrier can be measured, and can be compared to the computed minimum maximum output power for verifying the prioritization of the first carrier transmission in the user equipment.

In some instances, the output power for the first carrier and the second carrier can be measured by test equipment.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
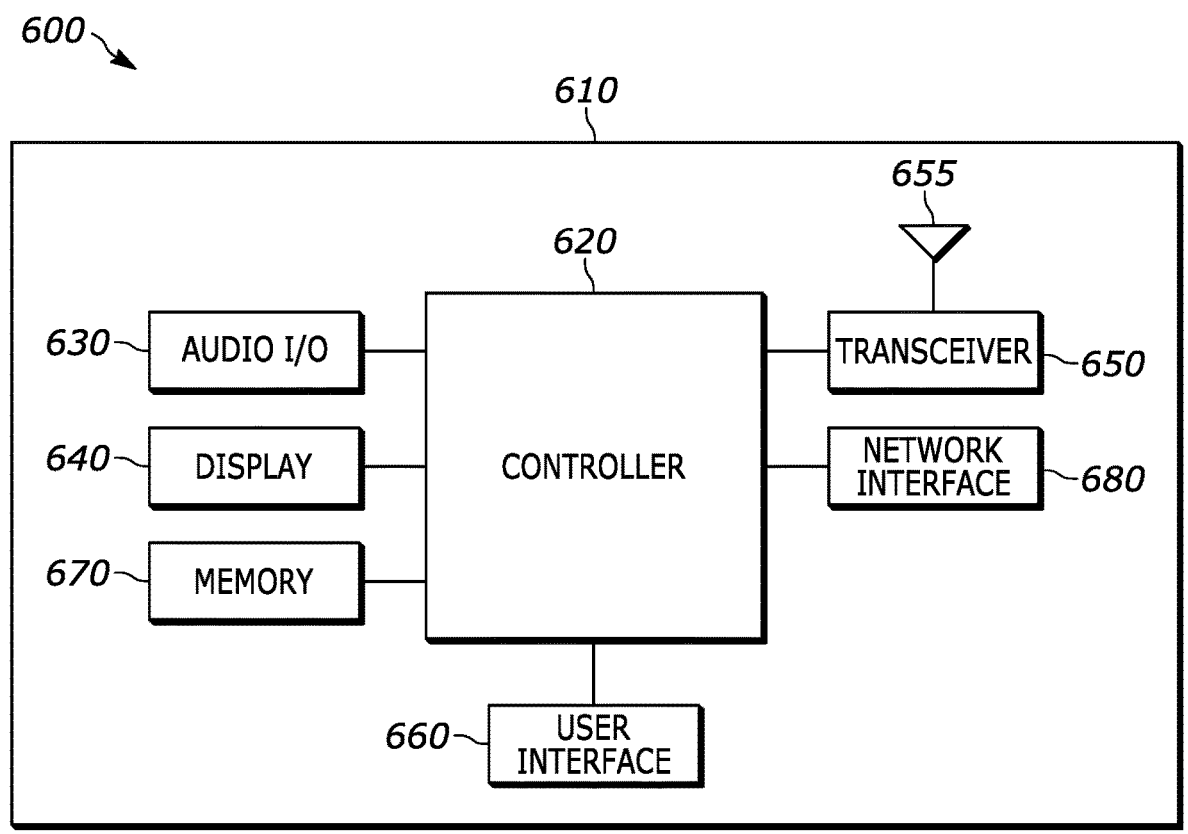
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments.

The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method for verifying use of dynamic power sharing in a user equipment between a first carrier transmission and a second carrier transmission, the method comprising:
   assigning a resource block allocation and modulation for a first carrier transmitted from the user equipment;
   assigning a resource block allocation and modulation for a second carrier transmitted from the user equipment;
   providing the user equipment a series of power up commands for both the first carrier and the second carrier until the measured output powers for the first carrier and the second carrier no longer increase;
   providing power down commands for the first carrier while providing power up commands to the second carrier; and
   measuring the output power for the first carrier and the second carrier and determining whether the output power for the second carrier increases as the output power for the first carrier decreases.

2. The method of claim 1, wherein the first carrier is associated with a communication with a master cell group.

3. The method of claim 1, wherein the first carrier is a long term evolution (LTE) carrier.

4. The method of claim 1, wherein the second carrier is associated with a communication with a secondary cell group.

5. The method of claim 1, wherein the second carrier is a new radio (NR) carrier.

6. The method of claim 1, wherein the power measured on the second carrier is compared to a threshold which depends on the power measured on the first carrier.

7. The method of claim 6, wherein the threshold corresponds to a computed lower limit of the maximum configured power for the second carrier.

8. The method of claim 7, wherein when the computed lower limit of the maximum configured power for the second carrier is equal to zero, the second carrier transmission can be dropped.

9. The method of claim 1, wherein a minimum maximum output power for first carrier transmission is computed based on the allocation and modulation for the first carrier; and
   wherein after providing the user equipment the series of power up commands for both the first and second carrier until the measured output powers for the first carrier and the second carrier no longer increase, the output power for the first carrier is measured, and is compared to the computed minimum maximum output power for verifying the prioritization of the first carrier transmission in the user equipment.

10. The method of claim 1, wherein the output power for the first carrier and the second carrier is measured by test equipment.

11. An apparatus for verifying use of dynamic power sharing in a user equipment between a first carrier transmission and a second carrier transmission, the apparatus comprising:
   a communication interface; and
   a controller that assigns a resource block allocation and modulation for a first carrier transmitted from the user equipment, and assigns a resource block allocation and modulation for a second carrier transmitted from the user equipment; and
   wherein the controller provides the user equipment a series of power up commands for both the first carrier and the second carrier until the measured output powers for the first carrier and the second carrier no longer increase, and then provides power down commands for the first carrier while providing power up commands to the second carrier;
   wherein the output power for the first carrier and the second carrier are measured, and a determination is made by the controller as to whether the output power for the second carrier increases as the output power for the first carrier decreases.

12. The apparatus of claim 11, wherein the first carrier is associated with a communication with a master cell group.

13. The apparatus of claim 11, wherein the first carrier is a long term evolution (LTE) carrier.

14. The apparatus of claim 11, wherein the second carrier is associated with a communication with a secondary cell group.

15. The apparatus of claim 11, wherein the second carrier is a new radio (NR) carrier.

16. The apparatus of claim 11, wherein the power measured on the second carrier is compared to a threshold which depends on the power measured on the first carrier.

17. The apparatus of claim 16, wherein the threshold corresponds to a computed lower limit of the maximum configured power for the second carrier.

18. The apparatus of claim 17, wherein when the computed lower limit of the maximum configured power for the second carrier is equal to zero, the second carrier transmission can be dropped.

19. The apparatus of claim 11, wherein a minimum maximum output power for first carrier transmission is computed based on the allocation and modulation for the first carrier; and
   wherein after providing the user equipment the series of power up commands for both the first and second carrier until the measured output powers for the first carrier and the second carrier no longer increase, the output power for the first carrier is measured, and is compared to the computed minimum maximum output power for verifying the prioritization of the first carrier transmission in the user equipment.

20. The apparatus of claim 11, wherein the apparatus is incorporated as part of test equipment.

* * * * *